United States Patent
Seet et al.

(10) Patent No.: US 7,165,039 B2
(45) Date of Patent: **\*Jan. 16, 2007**

(54) METHOD AND SYSTEM FOR ADVERTISEMENT USING INTERNET BROWSER TO INSERT ADVERTISEMENTS

(75) Inventors: Chern Hway Seet, Singapore (SG); Chee Kwan Chow, Singapore (SG); Eugene Eng Khian Tan, Singapore (SG); Hong Khoon Wan, Singapore (SG); Seng Beng Ho, Singapore (SG)

(73) Assignee: E-Book Systems Pte Ltd., Singapore (SG)

( * ) Notice: Subject to any disclaimer, the term of this patent is extended or adjusted under 35 U.S.C. 154(b) by 49 days.

This patent is subject to a terminal disclaimer.

(21) Appl. No.: 10/777,200

(22) Filed: Feb. 13, 2004

(65) Prior Publication Data

US 2004/0162760 A1    Aug. 19, 2004

Related U.S. Application Data

(63) Continuation of application No. 09/686,965, filed on Oct. 12, 2000, now Pat. No. 6,725,203.

(51) Int. Cl.
*G06Q 30/00* (2006.01)
(52) U.S. Cl. ........................................ 705/13
(58) Field of Classification Search .................. 706/14
See application file for complete search history.

(56) References Cited

U.S. PATENT DOCUMENTS

| | | | |
|---|---|---|---|
| 5,463,725 A | 10/1995 | Henckel et al. | |
| 5,721,827 A | 2/1998 | Logan et al. | |
| 5,909,207 A | 6/1999 | Ho | |
| 5,933,811 A | 8/1999 | Angles et al. | |
| 6,064,384 A | 5/2000 | Ho | |
| 6,199,082 B1 | 3/2001 | Ferrel et al. | |
| 6,229,502 B1 | 5/2001 | Schwab | |
| 6,438,233 B1 * | 8/2002 | Yoshimune et al. | 380/241 |
| 6,486,895 B1 | 11/2002 | Robertson et al. | |
| 6,496,803 B1 | 12/2002 | Ho et al. | |
| 6,725,203 B1 * | 4/2004 | Seet et al. | 705/14 |
| 2001/0050658 A1 | 12/2001 | Adams | |
| 2002/0035697 A1 | 3/2002 | McCurdy et al. | |

FOREIGN PATENT DOCUMENTS

| | | | |
|---|---|---|---|
| JP | 05011965 A * | 1/1993 | |
| JP | 11-122555 | 4/1999 | |
| JP | 2000-56721 | 2/2000 | |
| JP | 2000-113177 | 4/2000 | |
| JP | 2000-231475 | 8/2000 | |

OTHER PUBLICATIONS

"E-Book Systems introduces 'FlipBrowser 1.0 Beta,' the World's first E-book browser", Business Wire, Tuesday, Sep. 12, 2000.*

* cited by examiner

*Primary Examiner*—Donald L. Champagne
(74) *Attorney, Agent, or Firm*—Oblon, Spivak, McClelland, Maier & Neustadt, P.C.

(57) ABSTRACT

An electronic advertisement method and system for an Internet browser with a book-like page-based flipping interface. Full pages of electronic advertisements presented on the computer screen are possible without obstructing the viewing and reading of other contents. This benefits both the viewer as well as the advertiser. An advertisement matching/delivery system provides a novel method of inserting advertisements into content as well as a novel method for revenue sharing among the parties involved.

69 Claims, 17 Drawing Sheets

| | TRADITIONAL BOOKS | | NEWSPAPERS/ MAGAZINES | | TELEVISION/MOVIES | | INTERNET DATA TRANSMISSION | |
|---|---|---|---|---|---|---|---|---|
| DO THEY ADVERTISE... | SELF? | OTHERS? | SELF? | OTHERS? | SELF? | OTHERS? | SELF? | OTHERS? |
| CONTENT CREATOR | AUTHOR | Y Y | STAFF AUTHORS | Y Y | STATION STUDIOS | Y Y | AUTHORS | Y Y |
| | | Y N | PRIVATE AUTHORS | Y Y | PRIVATE STUDIOS | Y Y | STUDIOS | Y Y |
| | | | | | | | ETC. | Y Y |
| CONTENT "PUBLISHER" | BOOK PUBLISHER | Y N | MAGAZINE/ NEWSPAPER PUBLISHER | Y Y | TV NETWORKS/STATIONS | Y Y | WEB PUBLISHER | Y Y |
| DISPLAY DELIVERY | BOOK PRINTER | N N | PRINTER | N N | "BROADCASTER" | Y Y | WEB HOST | N N |
| | BOOK DISTRIBUTOR | N N | DISTRIBUTOR | N N | TV/THEATER MANUFACTURER | Y N | ISP | Y Y |
| | | | | | | | BROWSER PRODUCER | Y N |
| | | | | | | | MONITOR MANUFACTURER | Y N |

*FIG. 14*
*PRIOR ART*

METHOD AND SYSTEM FOR ADVERTISEMENT USING INTERNET BROWSER TO INSERT ADVERTISEMENTS

CROSS-REFERENCE TO RELATED PATENT DOCUMENTS

This application is related to patent application, Ser. No. 09/617,043, filed Jun. 14, 2000; Ser. No. 08/992,793, filed Dec. 18, 1997, now U.S. Pat. No. 6,407,757; U.S. Pat. No. 5,909,207; and U.S. Pat. No. 6,064,384, all of which being incorporated herein by reference.

BACKGROUND OF THE INVENTION

1. Field of the Invention

The present invention relates to a system and method for advertising using an Internet browser with a book-like, flipping page-based interface. The present invention takes advantage of the book-like interface to create a better advertisement-viewing/reading experience for the user on the one hand and more effective delivery of advertisements for the advertiser on the other hand. At the same time, a novel advertisement matching and delivery model in connection with this interface becomes possible and suggests new methods for matching up the content providers and advertisers, as well as methods for revenue sharing between the involved parties.

2. Discussion of the Background

Currently, documents available on the Internet are usually represented in the format of "hypertext." Each hypertext "page" can be arbitrarily long, and may or may not fit within one computer monitor screen. Pages of hypertext are linked by "hyperlinks"—on each page of a hypertext, there might be one or more "links" in the form of pictures or words which, when selected and clicked on (with, say, an input device such as a computer mouse) will cause the hypertext document to which the hyperlink is linked to appear on the monitor screen. In other words, the text of the new page replaces the earlier hypertext page. This is the mechanism by which, for example, the two most popular Internet browsers—Microsoft INTERNET EXPLORER® and Netscape COMMUNICATOR®—function.

In order to view a hypertext page that is longer and/or larger than one screen, one or more mechanisms is provided that scroll the page up and down (and/or left and right), or jump to a particular point in the page (through the use of, for example, a computer mouse coupled with scroll bars at the edges of the page displayed on the screen). In some embodiments, hyperlinks at one location in the hypertext page may point to another location of the same page and, when the hyperlink is clicked, the destination section is brought into view.

However, it is well known in human-computer interface research that these hypertext/hyperlink assemblages suffer from a number of problems. Chief among them is the navigation problem—the reader of a hypertext/hyperlink assemblage covering several pages often becomes lost during navigation of the hypertext pages. In other words, he/she often does not know where the displayed section of the hypertext/hyperlink assemblage is located relative to the entire content of the hypertext/hyperlink assemblage, what other content is present in the hypertext/hyperlink assemblage, where the other content is relative to the total content of the hypertext/hyperlink assemblage, and how to change the display from one section of the hypertext/hyperlink assemblage to another section of the assemblage.

Another disadvantage described by Internet surfers (people who read Internet documents) is that it is difficult to return to a particular hypertext page despite the fact that "forward" and "back" buttons are available on the Internet browser (such as Microsoft's INTERNET EXPLORER® or Netscape's COMMUNICATOR®). Since the hypertext pages are linked by a large number of links with no particular sequential or ordered multi-level organization, these two simple commands make transitioning from one page to another difficult when the reader hasn't followed a direct link between those pages. In other words, the "forward" and "back" buttons presume a sequential forward-backward organization in an assemblage that lacks such organization. Thus, the Internet surfers are often lost when trying to read a document with a complex organizational structure using only simple commands to proceed through the document.

On the other hand, sequential organization of information is found in the traditional book—pages are linked sequentially one after another. Though mechanisms for jumping across many pages are available, such as by selecting a page from the side of the book and flipping to the page, the information in the book is still laid out in an orderly, sequential manner. Also, a reader/browser can jump anywhere in the book at any time in any random order while maintaining a good understanding of where he/she is in the book because, in the process of flipping and jumping about, the location information is captured by the thickness of the book on both sides of a selected page, as well as during the flipping process. The flipping of the pages allows one to know the direction of movement through the document as well as how much one has moved through the document. The advantage of knowing where one is at any given time reduces the navigation problems if not eradicates them entirely.

Furthermore, one can also quickly and easily obtain an overview of all the information in the book by flipping through the book. On the other hand, a person is not only bound to become lost when browsing a 1000-page hypertext/hyperlink assemblage. Furthermore, such an individual will have difficulties obtaining an overview of the information content of such an assemblage.

Hence the major defects with hypertext—the navigation problems—are not present in the traditional book. One can browse a book of 1000 pages, and yet one can still comfortably know where one is, what else is in the book, and how to move from one point to another.

As a result, people browsing large amounts of information on the Internet often prefer to print the hypertext pages out on paper and then hold these sheets in their hands and browse through them much like the way they would browse through a book to look for and read information of interest.

The interaction between a reader/browser and printed material in a book is a subtle and complicated activity. To begin with, the material in a book is presented in a sequential order, with a continuity of material from page to page, and there is a hierarchical structure in the material presented (e.g., the material is organized into chapters, sections, subsections, etc.) because ideas in the material are related to each other in some kind of conceptual hierarchy. The human perceptual system inputs this data in a sequential manner, and after a book is read from the beginning to the end in a sequential fashion, the brain then recreates the conceptual hierarchy after viewing the material involved. However, very often one does not read a book (or input the material involved) from the beginning to the end because (a) one wants to have an overview of the material present; (b) one is searching for a particular item of interest; or (c) one is interested in reading only particular portions of the book (in the case of, e.g., reading the manual to understand how to operate something). In these cases, one browses through the subject book to find the material of unique interest.

Two basic things are achieved in the browsing process. First, the browser has a glimpse of what the contents of the book document are. Second, the browser has an idea of approximately where the items of interest are so that the browser can (a) return to look for them later when needed, and (b) understand the relationships between the material currently being viewed and other material (i.e., an understanding of the hierarchical structure involved). When browsing a book document, many finger-operations are required of the browser in order to flip through the pages. This mechanical act of flipping the pages, together with the inherent sequential order imposed by the pages, quickly allows the browser to have an understanding of the nature, location, and organization of the material in a book.

Similarly, the vast amount of information available on the Internet can benefit from the organizational structures normally found in a book, e.g., the sequential, page-by-page organization of information. These organizational structures give rise to two major benefits: 1, navigational problems are greatly reduced—e.g., they allow the browser to know where a particular portion of text is relative to the entire content of a document, what other information exists in that document, and how to move from one section of information to another in the case of browsing through hypertext pages, and 2, a good overview of the content of a document becomes easily available.

The sequential organization of information is not intended to replace the hyperlink mechanism available in a hypertext document. Instead, it is complementary to it. Other than having the pages linked in a sequential manner and accessible through a thickness display of the "book-like" representation, the hyperlink mechanism is retained and improves the browsing process. The advantage of the hyperlink is that the users can move quickly from one portion of the content to another related portion of the content. However, in the book-like, page-based sequential organization, when a hyperlink is selected and triggered, the process of going to the new portion of the content emulates the physical process. For example, flipping animation showing a number of pages moving across the screen proportional to the amount of information between the location of the hyperlink and the location pointed to by the hyperlink. This will aid users in knowing where the content they are reading and where the content that they will be reading is located within the hypertext/hyperlink assemblage and, combined with the traditional processes of hyperlinking, will aid the process of searching for information.

The hypertext linking mechanism is in some ways an electronic version of the traditional index usually found at the end of a book. When one is interested in a particular keyword or topic of interest, one may flip to the index at the end and, from there, move to another page that contains related keywords or topics. This two-step process—first moving to the index page then to the destination page—is achieved in one step with the hypertext linking mechanism. However, unlike physical paper books, the electronic hypertext linking process does not require physical flipping of pages to move to a new portion of the content. Instead, the electronic "goto" is effortless and instantaneous.

There are further differences between hypertext/hyperlink assemblages and traditional book (or magazine) representations of documents that are related to the placement and type of advertisements therein. In hypertext/hyperlink assemblages, advertisements that appear on the pages are rarely, if ever, sizable relative to the size of the page or the size of the viewable area on the computer screen. Therefore, advertisements most commonly appear as "banners" on the Web pages. However, in traditional paper books or magazines, advertisements often appear as full pages, and often as a succession of full pages. Even though advertisements on the pages of a traditional paper book or magazine still hinder and obstruct the reading and browsing process, especially in the case of full-page advertisements, this is somehow moderated by the book-like representation and tolerated by the users. This is in sharp contrast to advertisements in hypertext: full-page or multiple consecutive full-page advertisements on a hypertext Web page are anathema to many web readers.

The reason that full-page or multiple consecutive full-page advertisements are tolerable to readers of book-like representations is that the flipping page, book-like interface (such as in the cases of the traditional paper book and the interface of a special kind of flipping, book-like Internet browser described in co-pending patent application Ser. No. 09/617,043, filed Jun. 14, 2000, Ser. No. 08/992,793, filed Dec. 18, 1997, as well as a special kind of book-like human-computer interface described in U.S. Pat. No. 6,064,384) creates a 3-dimensional effect. Users feel that they can simply flip these "obstructing" pages away very easily (either using their hands directly on the pages in the case of the paper book or using an input controller such as a mouse in the case of the special Internet browser described in copending patent application Ser. No. 09/617,043, filed Jun. 14, 2000, or using a special flip-browsing controller described in U.S. Pat. No. 5,909,207)

Book-like representations thus provide a new method and system for electronic advertisement. In contrast with this new method and system, traditional advertisements on scrolling or hypertext/hyperlink assemblages are too restrictive from the point of view of the advertiser.

Advertisement is a necessary component of modern commerce. Conflicting issues are involved in advertising and include the facts that 1, the advertiser wants to deliver a message to the consumer, so the attention of the consumer has to be captured, and 2, the advertiser must not present the advertisement in a way or to the extent that it hinders the reading/viewing activity of the consumer or annoys the consumer.

The current advertisement method on the Internet is very restrictive. An advertiser can only display "banner" ads, as explained earlier. This is due to the kind of interface currently available on computers—the Windows interface which derives from the "desktop" metaphor which basically involves a presentation of a series of 2-dimensional "window" interfaces. On this kind of interface, the advertisers either have to contend with a small banner, which does not quite satisfy the need to deliver a message effectively to the consumers, or they have to enlarge the banner which hinders the activities of the consumer and annoys the consumer. Therefore, the parameters of the advertisement are very limited and not necessarily effective.

Another current method of advertisement on the Internet uses a pop-up window whenever the user enters a certain Web page to view data. This type of pop-up window is ineffective for both the consumer and the advertiser. From the point of view of the consumer, pop-up windows are annoying, especially when they are big. From the point of view of the advertiser, pop-up windows are ineffective because the pop-up window, unlike the usual banner advertisements on the Web pages, are not displayed long enough for the consumer to absorb the message. Many consumers simply close the pop-up window or move the desired Web contents into view and relegate the pop-up window to the background. Thus, the pop-up windows are commonly not viewed by the consumer for any period of time.

Moreover, another problem with current browsers and browsing methods relates to their limited ability to identify, contact, and recruit advertisers that will be inserting advertisements into the displayed content.

FIG. 14 is a table that illustrates various participants (along the abscissa) in the process of delivering various forms of content (along the axis) to a consumer, as well as their advertising practices. For example, in traditional books (first column), the book content is created by an author, "published" by a book publisher, and delivery of a "display" of this content (i.e., the book) is performed by a printer who manufacturers the books and a distributor who, in one form or another, brings the printed book to the consumer. In traditional book publishing, the advertisement process is limited to only a few participants and is furthermore unresponsive to changes in the marketing environment. For example, an author can insert advertisements into the content that advertise him/herself (such as the self-aggrandizing statements commonly found in the autobiographies of sports figures) or others (such as a commercial company that has paid the author to "place" a product within a particular manuscript). The book publisher commonly has almost no ability to advertise within the content, but rather chooses to place advertisements before and/or after the content. Furthermore, these advertisements only relate to the publisher and commonly amount to nothing more than a publisher's name on the book jacket or on the title page, and possibly a listing of other books available from the same publisher and/or author found before or after the content. Finally, the entities that deliver the content display to the consumer, namely the printer and book distributor (such as a bookstore), have almost no ability to insert advertisements regarding themselves and/or others into or before/after the content.

A similar situation is found in regard to the participants in the process of delivering newspaper/magazine content to consumers (FIG. 14, second column), except for the fact that magazine/newspaper publishers actively advertise for others both within and before/after the content. Once again, the entities that deliver the content display have almost no ability to insert advertisements.

In regard to the delivery of television/movies content to consumers (FIG. 14, third column)., the entities that deliver the display have developed methods of inserting advertisements before the content. For example, movie theaters commonly insert advertisements for themselves and for local businesses prior to the showing of a film. Furthermore, the manufacturers of the display also insert advertisements prior to the start of a film. An example is the advertisements for "DOLBY SURROUND SOUND" commonly shown prior to commencement of the film. In these cases, the entities that deliver the content to the consumer have developed a limited ability to advertise before the delivery of the content.

Advertisement in Internet data transmission has not yet been developed even to the extent known in the delivery of movie/television content displays. As shown in the fourth column of FIG. 14, there are several entities that participate in delivery of the content to the consumer. A separate web host can maintain and/or update a memory containing the content under the direction of a web publisher. An Internet service provider can transmit the content data from the web host memory to a consumer's site. A browser producer can provide a browser that will decode and generate instructions for displaying the content data at the consumer's site. Finally, a monitor or other output device can display the content under the instructions of the browser.

The insertion of advertisements by each of these entities that deliver Internet content to the consumer is haphazard at best. For example, the web host is entirely unknown to an individual who is accessing content stored on the web host's computers. Internet service providers such as NETZERO place a banner advertisement across the top of the display screen. Thus, this banner is neither inserted into the actual content nor targeted to the content being accessed, and furthermore retains the aforementioned problems of banner advertisements. Monitor manufacturers only include a corporate logo located outside the content display area, and generate no direct advertising revenue thereby.

Advertisements recruited, selected, and displayed by a browser producer are likewise primitive. Both NETSCAPE NAVIGATOR and MICROSOFT INTERNET EXPLORER have limited advertisements to a title of the browser program and one or more corporate trademarks displayed at various locations on the browser window. This prohibits the browser producers from advertising for others than themselves, from inserting the advertisements-within the displayed content, and from receiving revenue for the advertisement of various products made by others.

Therefore, the inventor has identified a need for a novel system and method for electronic advertisement that can be integrated into an Internet browser. Moreover, the inventor has identified an Internet browser with a book-like interface such as that described in copending patent application Ser. No. 09/617,043, filed Jun. 14, 2000 or a special kind of book-like human-computer interface described in U.S. Pat. No. 6,064,384 that takes full advantage of the interface for the most effective delivery of advertisements to the users. The inventor has furthermore recognized that advertisements inserted by the browser can lead to different revenue sharing models.

SUMMARY OF THE INVENTION

In view of the aforementioned short-comings of presently available schemes for delivering electronic advertisements on the Internet, one objective of the present invention is to provide a novel method and system for electronic advertisement that is modeled after the traditional paper book. These involve inserting pages of advertisements among the contents that are represented in a flipping book-like manner. The advertisements inserted in this manner do not obstruct or hinder the reading of the contents to an extent that will annoy the reader.

Another objective of the invention is to provide a novel method and system for inserting full-page, multiple full page, or nearly full-page advertisements in between pages of materials downloaded from the Internet.

Yet another objective of the invention is to provide a novel method and system for inserting advertisements either among the pages that belong to a single electronic book or to a Web site currently being browsed using an Internet browser, or between pages belonging to different electronic books or Web sites.

A further objective of the invention is to provide a novel electronic advertisement matching/delivery method and browser system that recruits, selects, and/or identifies advertisers, and matches them with content providers/authors through a advertisement portal site based on the classification of the contents of a hypertext/hyperlink assemblage.

A yet further objective of the invention is to provide a novel method and system for "dynamically" delivering and/or streaming advertisements to users using a book-like Internet browser to browse information on the Internet.

Another objective of the invention is to provide a novel "static" advertisement delivery method and system where advertisements are pre-delivered and incorporated into the electronic books hosted on some Web sites.

Yet another objective of the invention is to provide a novel "static" electronic advertisement request method and system which allows users/electronic book authors/content providers to specify the kind of advertisements they are looking for and other parameters of the advertisements so that an automatic advertisement matching system can identify the relevant advertisements to be incorporated into the electronic books hosted on some Web sites.

A further objective of the invention is to provide a novel "static" electronic advertisement offer method and system which allows advertisers to specify the kind of advertisements they are offering (as well as other parameters of the advertisements) so that an automatic advertisement matching system can identify the relevant advertisements to be offered to electronic book authors or other content providers.

A yet further objective of the invention is to provide an automatic advertisement matching system and method that will automatically match advertisement requests and advertisement offers resident in a database.

Another objective of the invention is to provide a novel method and system for extending the existing electronic book format—the OEB format—to encode the unique-parameters associated with how advertisements are to appear within an electronic book.

Yet another objective of the invention is to provide a privacy-ensured method of dynamically streaming information to an Internet browser so that his or her identity is not compromised.

A further objective of the invention is to provide a revenue sharing method and system for all parties involved in the novel advertisement matching/delivery method and system.

A yet further objective of the invention is to provide a method and system for Web sites and HTML pages to provide a classification code for their contents to facilitate matching of advertisers with content providers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 14 is a table illustrating participants in bringing content to a consumer, and known advertisement methods of those participants.

DETAILED DESCRIPTION OF THE PREFERRED EMBODIMENTS

Figure 1A:
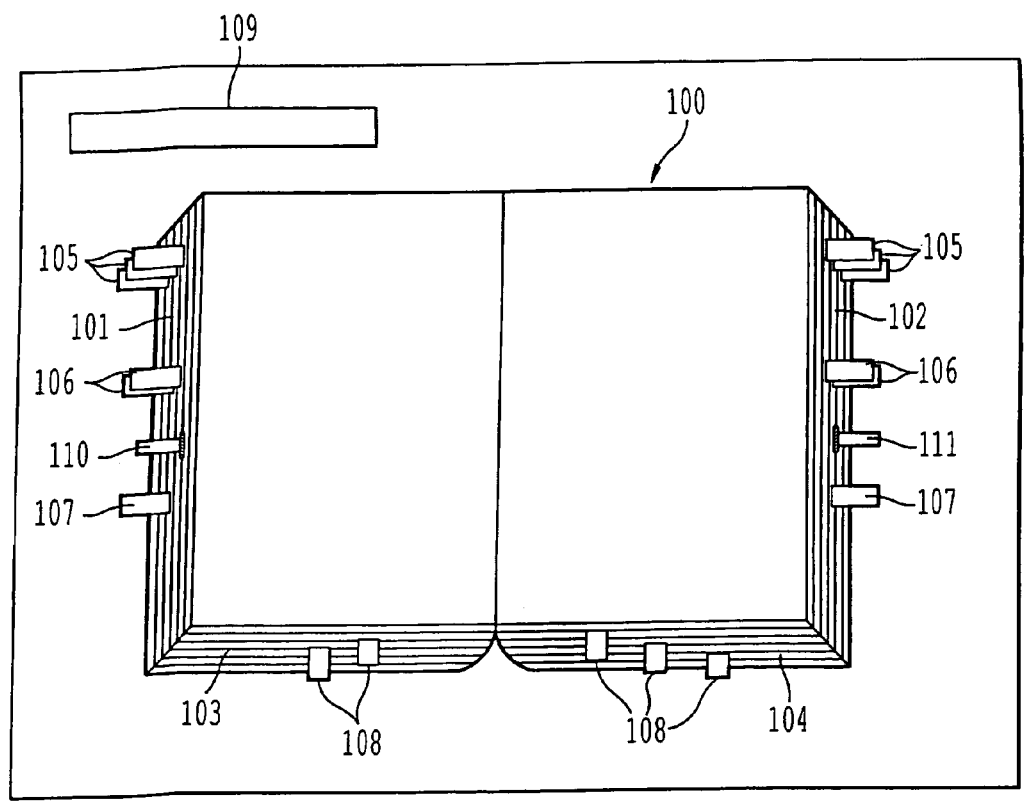
FIG. 1A is a top perspective view of an exemplary Internet browsing book displayed on a computer screen that is used to display information downloaded from the Internet.

Referring now to the drawings, wherein like reference numerals designate identical or corresponding parts throughout the several views, and more particularly to FIG. 1A thereof which depicts one embodiment of the Internet browser interface. The information downloaded from the Internet is displayed on two pages as in an opened book. At this stage, a number of Internet pages have been browsed and collected in the "Internet browsing book" 100. The amount of material before and after the current pages (the pages in view) is shown as varying thicknesses on the left and right sides (101 and 102), respectively (as well as the left and right bottom edges (103 and 104)), of the book. On the left and right thicknesses (101 and 102) are shown a number of bookmarks (105–107) that bookmark some of the pages that have been viewed earlier. There are three types of bookmarks on these thicknesses. They are page-bookmarks 105, annotation bookmarks 106, and finger bookmarks 107. These bookmarks are described in detail in copending application Ser. No. 09/617,043, filed Jun. 14, 2000. On the bottom thicknesses (103 and 104) are shown a number of keyword bookmarks 108. A URL (Universal Resource Locator) field 109 above the browsing book 100 allows URL addresses to be entered.

In order to allow the user to select any desired page, jump cursors 110 and 111 are provided on the left and right thickness (101 and 102). The user, using a mouse or other control, can move the left or right jump cursors (110 and. 111, respectively) up and down the left or right thicknesses (101 and 102, respectively). The page number may appear on the tag of the jump cursor to display the page selected by the jump cursor. When the user has decided to jump to a certain page using the jump cursor to select that page, he/she can use the mouse or other input device to activate the jump.

Figure 1B:
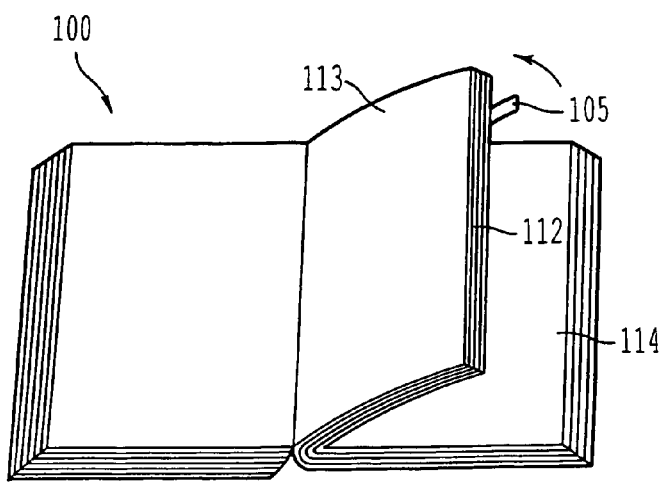
FIG. 1B is a top perspective view of the exemplary Internet browsing book displayed on the computer screen during the process of jumping a number of pages ahead in the book.

FIG. 1B depicts the display when a selected page in the browsing book 100 is jumped to. This jump may have been either-activated, e.g., by the selection of a bookmark (e.g., page-bookmark 105) or by the jump cursor (e.g., jump cursor 110 or 111). The thickness 112 between the page originally in view 113 and the page jumped to 114 is shown moving across the computer screen in continuous animation, much like in a physical book.

Figure 1C:
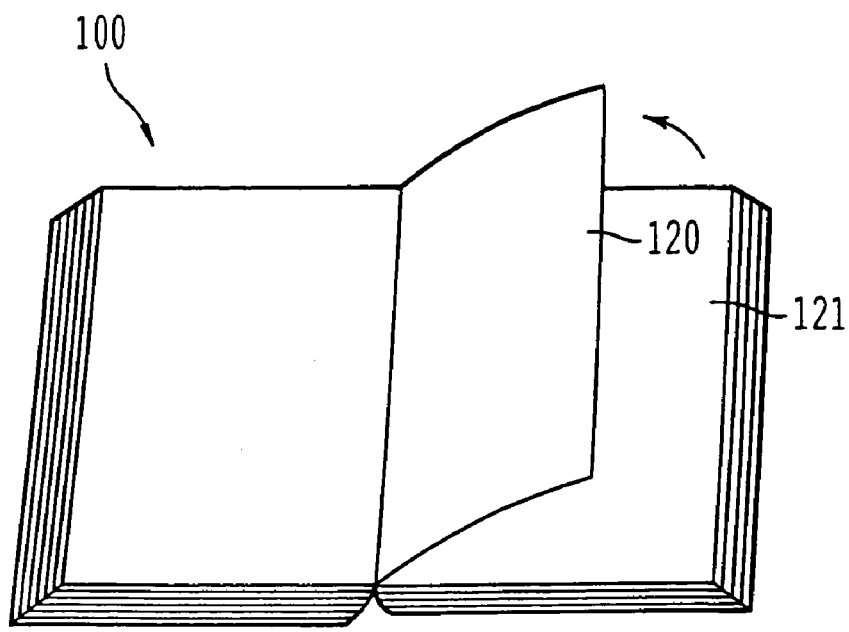
FIG. 1C is a top perspective view of the exemplary Internet browsing book displayed on the computer screen in the process of flipping to the next page.
Figure 1D:
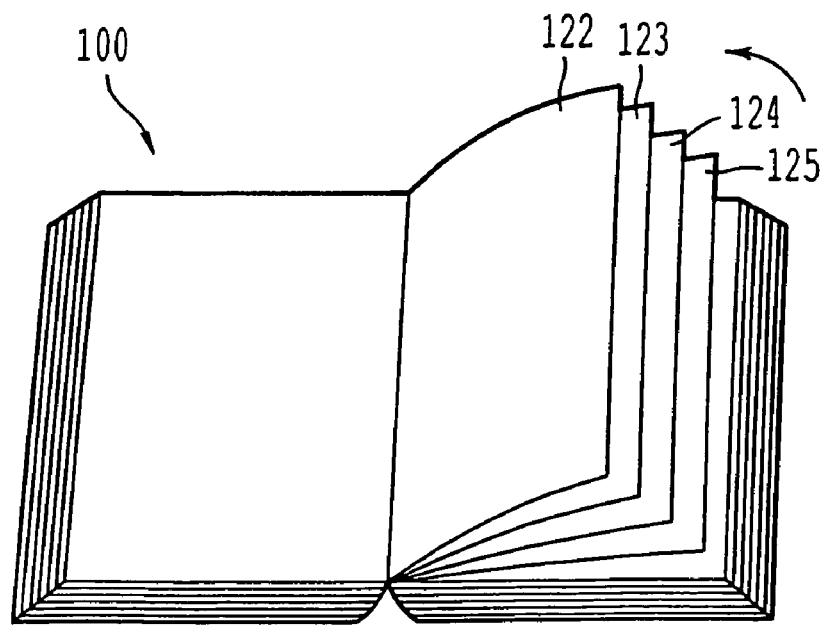
FIG. 1D is a top perspective view of the exemplary Internet browsing book displayed on the computer screen during the process of flipping many pages simultaneously.
Figure 2A:
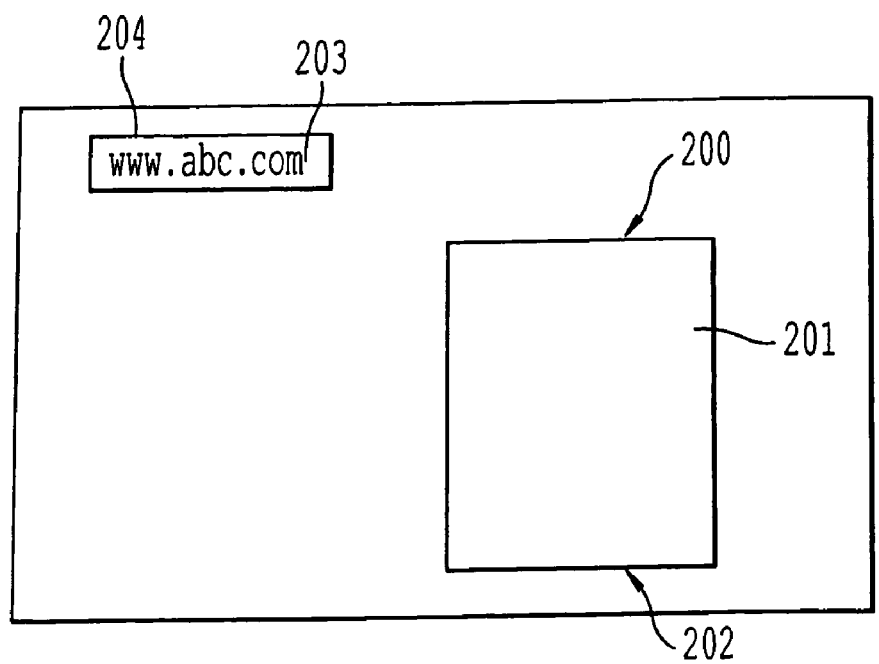
FIG. 2A is a top perspective view of the exemplary Internet browsing book just before the start of a browsing session before information is downloaded from the Internet.
Figure 2B:
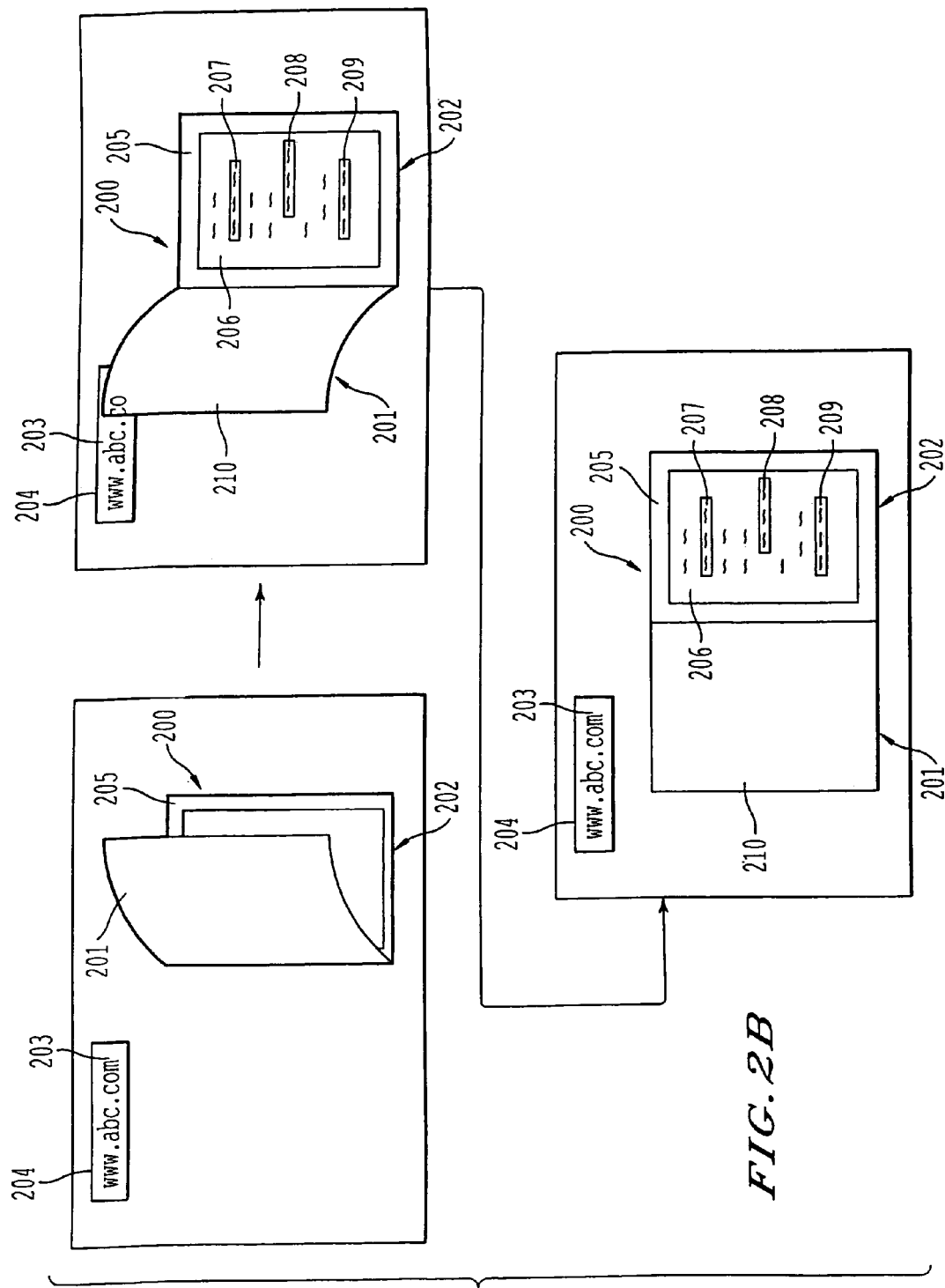
FIG. 2B is a sequence of top perspective views of the exemplary Internet browsing book in the process of downloading some new information from the Internet in response to the entry of a URL.
Figure 2C:
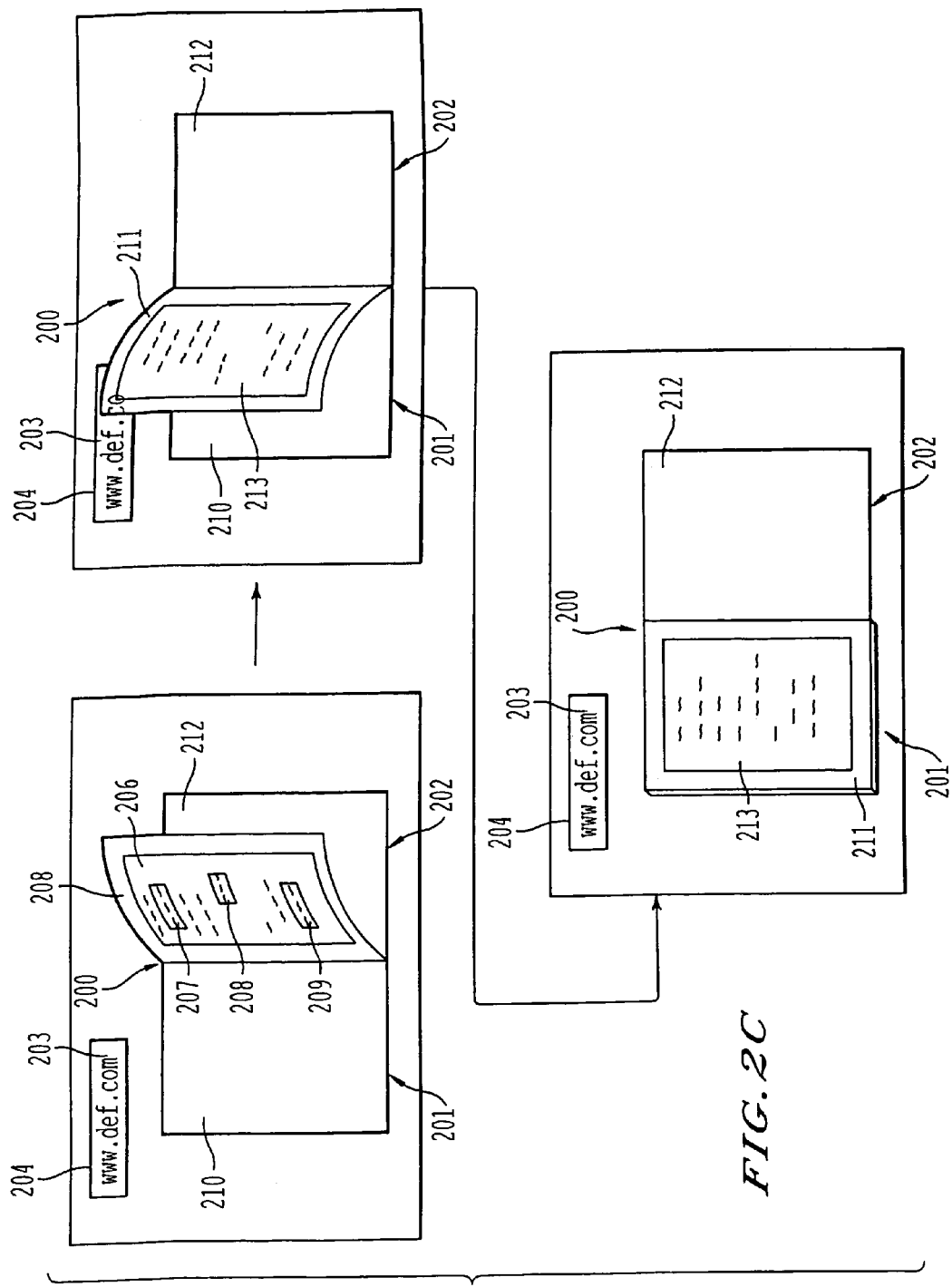
FIG. 2C is a sequence of top perspective views of the exemplary Internet browsing book in the process of downloading some new information from the Internet in response to the selection and activation of a hyperlink on the page of the exemplary Internet browsing book.

FIG. 1C depicts the display when one page 120 in the browsing book 100 is being flipped. The page 120 is shown bending and moving across the computer screen to reveal the underlying page 121. FIG. 1D depicts the display when, because of an increased rate of moving through the browsing book 100, more than one page (122–125) is moving across the computer screen at the same time. The user can then select to freeze all the pages in motion, if desired. FIG. 2A–2C depict example display when the browsing book 100 is created. FIG. 2A shows the beginning of an Internet browsing process when a browsing session is launched. A book 200 is created and displayed. At this time the book consists only of the front cover 201 and back cover 202.

FIG. 2B depicts what happens when a URL 203 (Universal Resource Locator—the address of a "Web page") is entered into the field 204 on the top of the display and activated. The front cover 201 of the browsing book 200 is flipped open, revealing a new page 205 in the book 200. On the new page 205, the web page 206 of the URL 203 is displayed. The left hand page (210) is empty.

A number of hyperlinks (207–209) are available on the web page 206. FIG. 2C depicts what happens when hyperlink 207 on the web page 206 (FIG. 2B) is selected and activated. The page 205 flips to reveal two more new pages (211 and 212) added to the browsing book 200. On page 211, the contents of the Web page 213 pointed to by the hyperlink 207 (FIG. 2B) are displayed. The left side of the Internet browsing book 200 now indicates a relatively small thickness because of the limited number of pages added to the left side. As more contents are brought into the Internet browsing book 200, the book acquires increased thicknesses on both sides.

Figure 3A:
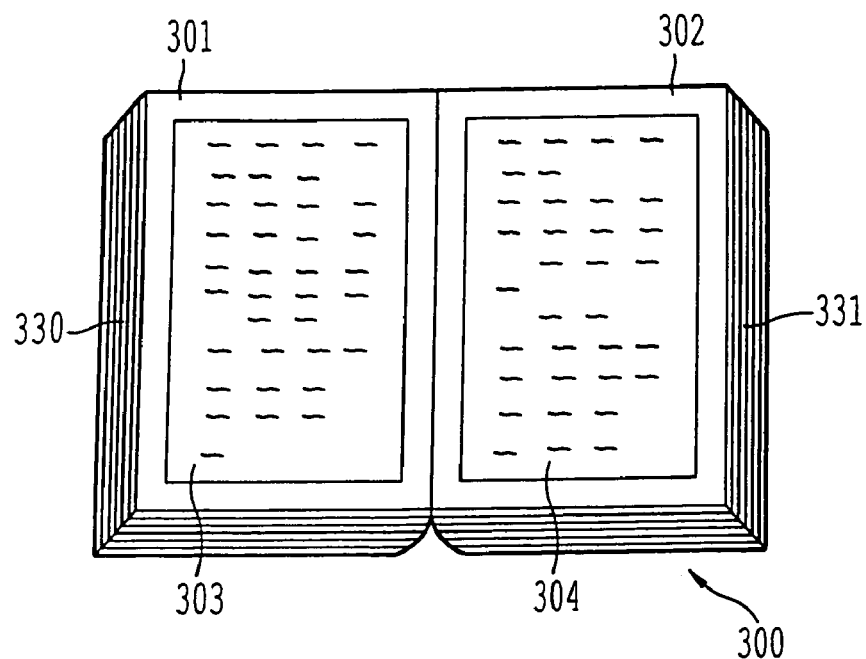
FIG. 3A is a top perspective view of the exemplary Internet browsing book after it has acquired a number of pages of Internet information.

FIG. 3A shows a situation in which a sizable Internet browsing book 300 (as reflected in the thicknesses 330 and 331) has been created through the browsing process. Increasingly more contents have been brought into the browsing book through various mechanisms. Copending patent application Ser. No. 09/617,043, filed Jun. 14, 2000, describes a number of methods and systems by which the new contents can be added to the browsing book. FIG. 3A depicts two pages 301 and 302 that are currently visible. The contents 303 are displayed on the left page 301 and the contents 304 are displayed on the right page 302. These contents 303 and 304 may contain advertisements. The advertisements can appear either as a banner smaller than the boundaries defined by the contents 303 and 304, or they fill the entire contents 303 and 304 by themselves. The advertisement pages can also be on one of the pages 301 and 302 or on both pages (301 and 302), and may even cover further, successive pages.

Figure 3B:
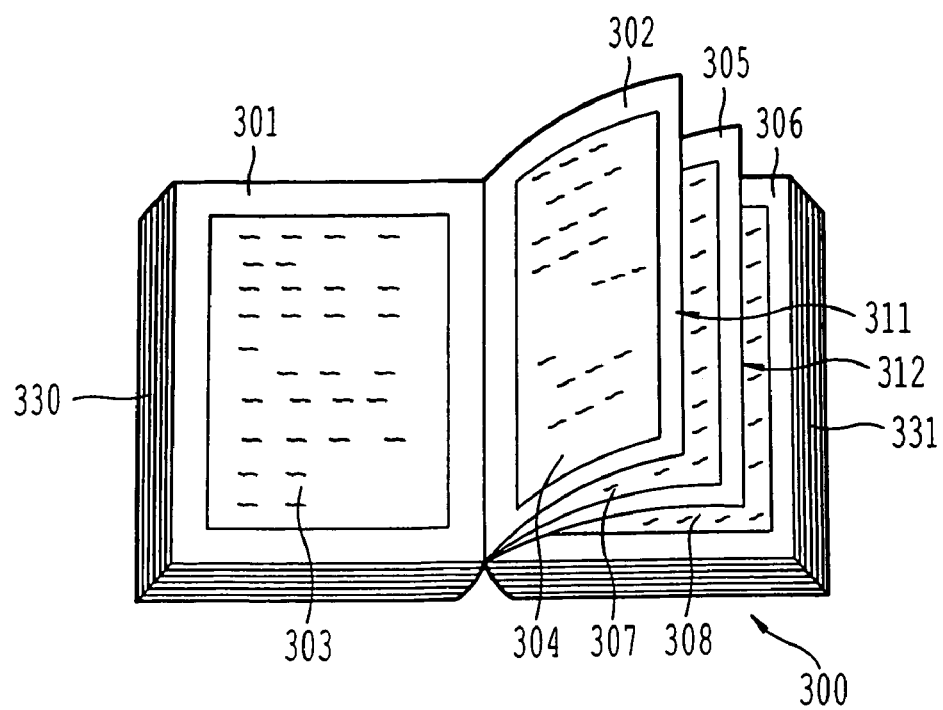
FIG. 3B is a top perspective view of the exemplary Internet browsing book showing a number of flipped open pages, some of which may contain advertisements.

FIG. 3B shows a flipped-open browsing book 300 that contains contents 303, 304, 307, and 308 displayed over the pages 301, 302, 305 and 306, respectively. Some of the contents 311 and 312 are displayed on the rear side of pages 302 and 305, respectively. The advertisement contents may appear over more than the two pages 301 and 302 and/or on all the pages 301, 302, 305, 306, 311 and 312. The contents may fully occupy these pages, or they may occupy only a portion of these pages.

Advertisements may also be displayed on many single pages, pairs of pages, or groups of pages throughout the entire browsing book 300. The advertisements may fully occupy these pages or occupy smaller footprints within these pages. Naturally, combinations of full-page and smaller footprint displays are possible.

In addition to the fact that advertisements can appear as full-page(s), another advantage of an Internet browsing book is that advertisements can be selected not only by the Web site or document content providers, but also by the intermediary that delivers the contents to the reader/browser. For example, in FIG. 3B, contents 303 and 304 (appearing on pages 301 and 302 respectively) may be contents created by Company X accessed earlier by the browsing book 300 through a URL address or a hyperlink somewhere on the browsing book 300. On these pages (301 and 302), banner or full-page advertisements could be displayed by Company X, where Company X might have collected advertisement fees from yet other companies who associated these advertisements with Company X's contents 303 and 304. Then, for example, at a later position in the browsing book, contents 312 and 308 (on the back of page 305 and the front of page 306, respectively), contents created by Company Y accessed by the browsing book 300 through a URL address or a hyperlink on some of the pages of the browsing book 300 might be found. Again, within or around these contents 312 and 308, advertisements by Company Y regarding their own products (or yet other companies' products where Company Y had collected advertisement payments from these other companies) might be found. Furthermore, between page 302 and the back of page 305, contents 311 and 307 that include advertisements delivered by a server that is specialized in feeding advertisement contents to the browsing book (say, Advertisement Server 411 in FIG. 4) may be found. Thus, within a single "book" display, advertisements from several different sources are present, even when those sources play different roles in the generation and presentation of the contents of the book.

Alternatively, contents 303, 304, 312 (found on the back of page 305) and 308 together contain contents belonging to Company X or Author V, for example, and advertisements can be inserted between these pages—contents 307 and 311 (back of page 302). These contents (303, 304, 312, and 308) that belong to a given company or a given author such as Company X or Author V can either be loosely related HTML pages or pages that are bound together in a book format, e.g., the OEB (Open Electronic Book) format. The advertisement insertions (307 and 311) can thus be inserted either between these HTML pages or inside the OEB book.

Therefore, one parameter which can be used to characterize the delivery of advertisements is whether the advertisement is inserted between different books (e.g., OEB books or pages belonging to the same Web site) or within the same book or pages belonging to the same Web site, as depicted in FIG. 3 and described above.

Figure 4:
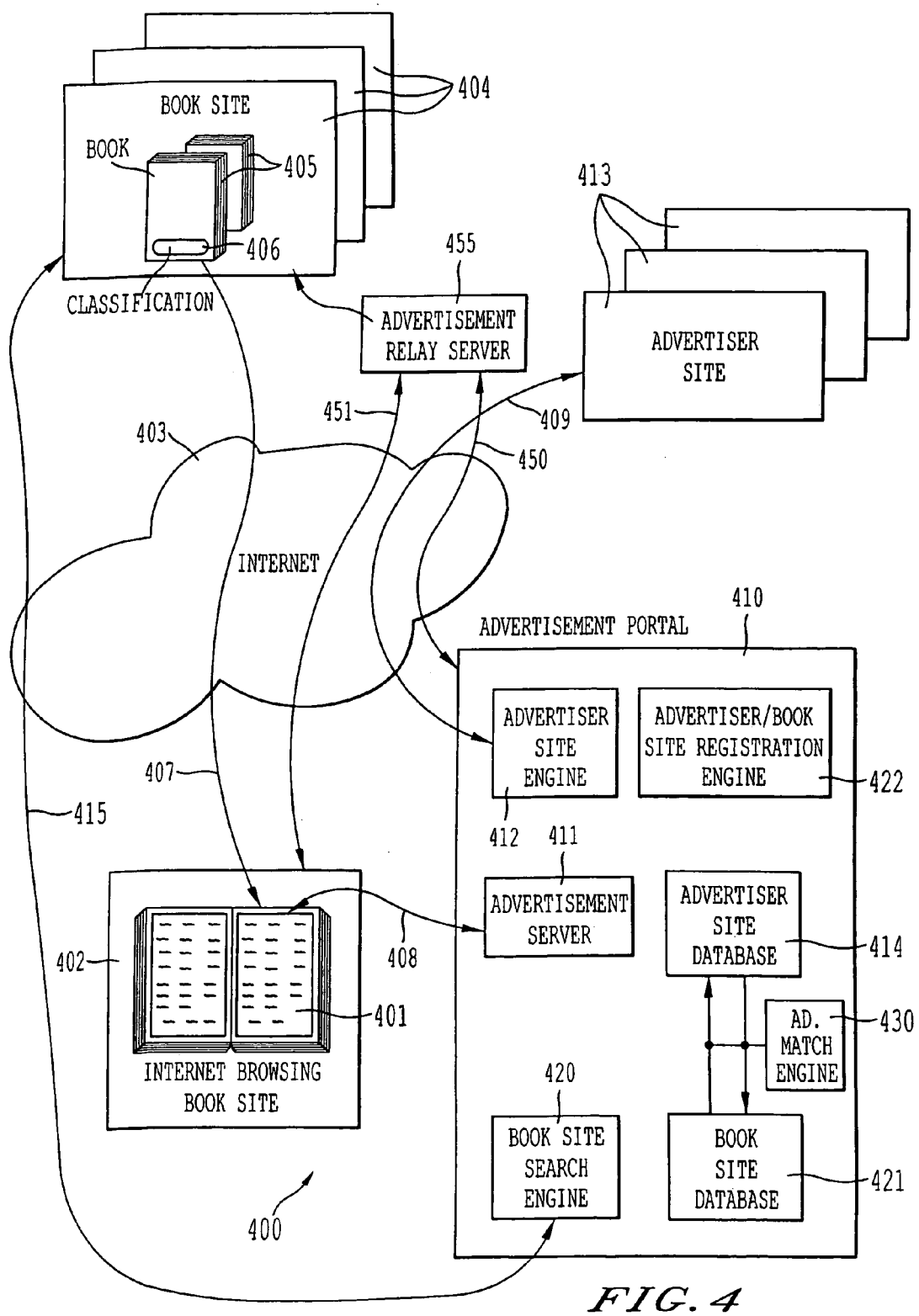
FIG. 4 is a diagram showing the various components of an exemplary advertisement matching/delivery system on the Internet.

FIG. 4 depicts an Advertisement Matching/Delivery system 400 for locating and delivering advertisements into a browsing book. Consider that the browsing book software 401 is running on a computer at an Internet browsing book site 402. The user who is running the Internet browsing book 401 requests a document/book 405 in the OEB format. This request is transmitted through the Internet 403 (through, say, a data link 407) to one of the book sites 404, and the desired book is returned from one of the book sites 404 to the Internet browsing book 401. The OEB Book 405 may contain a classification code 406 that describes the contents of the Book 405. The browsing book software 401 then uses the classification code 406 to request one or more relevant (e.g., targeted) advertisement(s) from the Advertisement Server 411 in the Advertisement Portal Site 410 through the data link 408.

Upon the request from the Browsing Book 401 for advertisements, the Advertiser Search Engine 412 can go to Advertiser Sites 413 to search for relevant advertisements (for example, based on the classification of the book 406), through the data link 409. Alternatively, an advertiser site database 414, created in the advertisement portal site 410, can provide data describing a relevant advertisement to the advertisement server 411. The advertisement server 411 thus can retrieve one or more advertisements from the advertisement site database 414 based on the classification of the book 406 and deliver the retrieved advertisement(s) to the browsing book 401.

This process is Internet browsing book-driven advertisement matching/delivery where the request for advertisements/advertisers comes from the Internet browsing book site 402. This process is also known as the Dynamic Advertisement Streaming Method.

At the advertisement portal site 410, there is also a advertiser/client registration engine 422 that allows advertiser sites 413 and book sites 404 to pre-register themselves onto the advertiser site database 414 and the book site database 421, respectively. The advantage of pre-registration is that these book sites and advertiser sites have, e.g., priority of being offered as a candidate when a request for an advertiser or book of a certain nature or classification is made. The Advertiser Site Database 414 and Book Site Database 421 may contain various parameters associated with advertisements offered by the advertiser from the advertiser sites 413 and advertisements requested by the book/content author from book sites 404, respectively. These parameters will be described shortly.

Either in addition to or in substitution for the above dynamic advertisement streaming method where the advertisement is dynamically delivered to the browsing book depending on the browsing book's contents and requests, a "Static Advertisement Delivery Method" where advertisements are pre-delivered and incorporated into the books 405 at the book sites 404 can also be used.

The "static" advertisement delivery method can be further divided into two methods: the "pull" method and the "push" method. In the pull method, the book site 404 initiates the request for advertisements. Once the request is initiated, the database is search and presumably a relevant advertisement is found. The advertisement matching process can be manual, e.g., performed by a book site 404 employee searching the advertiser site database 414 in the advertisement portal 410 or other available sources of advertiser site 413 data, or automated, e.g., the book site 404 employee enters the request for an advertisement by specifying, for example, a number of parameters, such as the name of the specific advertisement (e.g., a Coca Cola® advertisement), or the name of the category of advertisement (e.g., a golf advertisement), time of display of advertisement on the book sites' book 405, length of display time, dimensions of advertisement, position in the book 405 in which it will appear, rates offered, etc.

Figure 5A:
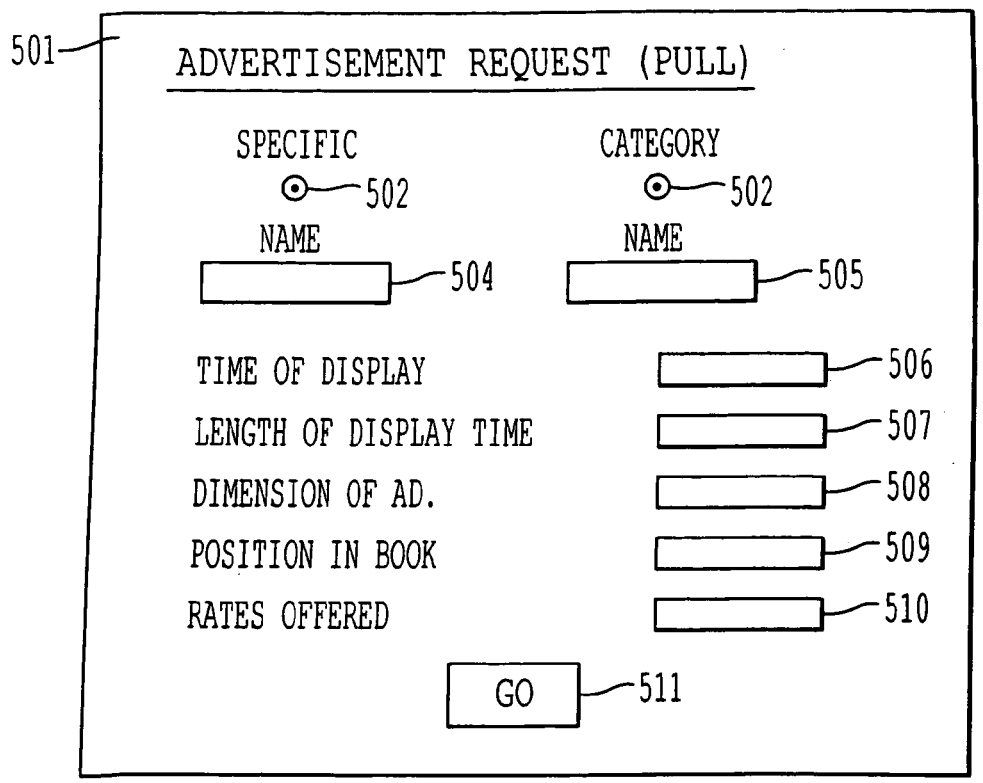
FIG. 5A is a diagram showing an exemplary Advertisement Request Interface used for requesting for advertisements.

FIG. 5A shows an exemplary advertisement request (Pull) interface 501 on a computer that can be used to initiate a static advertisement "pull" process. A specific advertisement type 502 and/or category 503 can be specified. The name of the specific advertisement selection 504 and/or name of the category 505 can also be specified. Other things that may be specified include, e.g., time of display of advertisement 506, the length of display time 507, the dimensions of the advertisement 508, the position of the advertisement in the book 509, rates offered 510, etc. After data have been entered, pressing the GO button 511 initiates the advertisement search and matching process on the advertiser site database 414.

In the "push" method, the advertiser initiates the advertisement offer process. Again, the advertisement matching process can be manual, e.g., performed by an advertiser site 413 employee searching the book site database 421 in the advertisement portal 410 or other available sources of book site 404 data, or automatic—e.g., the advertiser site 413 employee enters the offer of an advertisement by specifying one or more parameters, such as, e.g., the name of the specific advertisement (e.g., Coca Cola advertisement), or the name of the category of advertisement (e.g., a golf advertisement), time of display of advertisement on the book sites' books 405, length of display time, dimensions of advertisement, position in the book 405 in which it will appear, rates requested, etc.

Figure 5B:
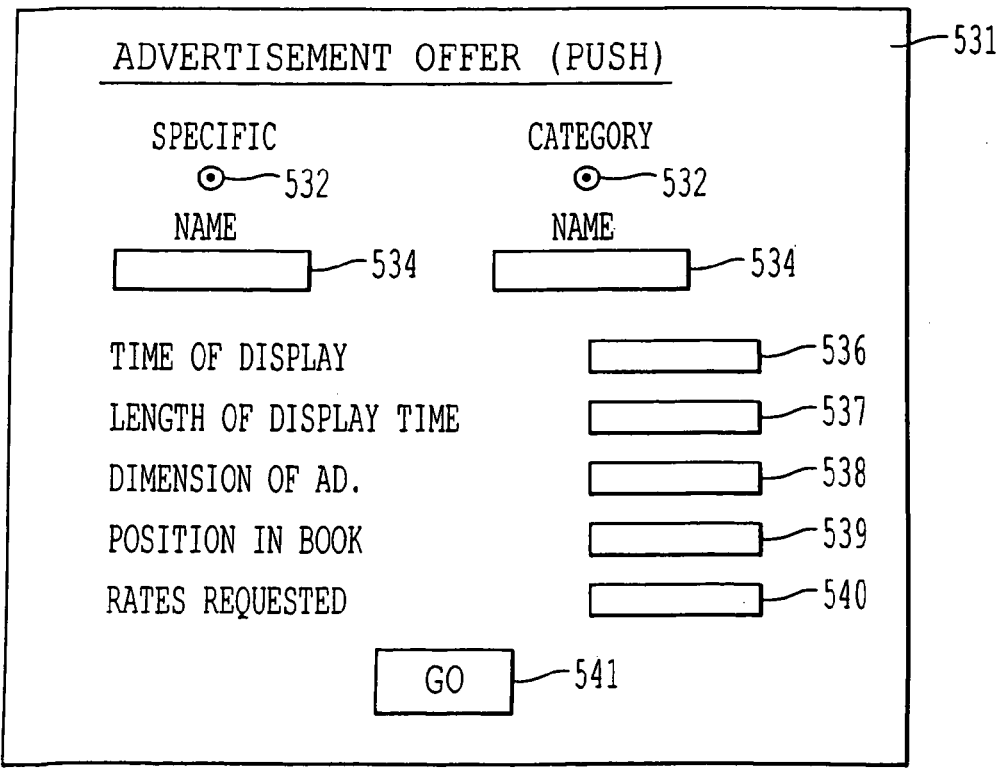
FIG. 5B is a diagram showing an exemplary Advertisement Offer Interface used for offering advertisements.

FIG. 5B shows an exemplary advertisement offer (push) interface 531 on a computer that can be used to initiate a static advertisement "push" process. A specific advertisement 532 and/or type of category 533 can be specified. The name of the specific advertisement 534 and/or name of the category 535 can also be specified. Other things that can be specified include, e.g., time of display of advertisement 536, length of display time 537, dimensions of the advertisement 538, position in book 539, rates requested 540, etc. After data have been entered, pressing the GO button 541 initiates the advertisement search and matching process at the book site database 421.

During the search for an advertisement match, the search process can reach beyond the advertiser site database 414 or the book site database 421. In the process of searching for an advertiser, the advertiser site search engine 412 can be activated to search for matching advertisers in some advertiser sites 413 through the data link 409. In the process of searching for a relevant book 405, the book site search engine 420 can be activated to search for matching books 405 in some book sites 404 through the data link 415.

Alternatively, the selection and matching of advertisements can be initiated by an automatic advertisement matching engine 430 as depicted in FIG. 4. Unlike in the case of the advertisement request or offer processes as depicted in FIGS. 5A and 5B, which is triggered by the GO buttons (511 or 541) and carried out on the existing advertiser site database 414 or book site database 421, respectively, the automatic advertisement matching engine 430 carries out matching between data in the advertiser site database 414 and book site database 421 as and when new data are added to them. That is, in an earlier session after an advertisement request process (FIG. 5A) or an advertisement offer process (FIG. 5B) was carried out, the book site database 421 or the advertiser site database 414 respectively may have captured the specified advertisement parameters (502–510 or 532–540). Now, when new additional data are added into the advertiser site database 414 or book site database 421, the automatic advertisement matching engine 430 will initiate a matching process between the two databases (414 and 421) and report to the book sites 404 or the advertiser sites 413 as and when any new matches are found.

Figure 6:
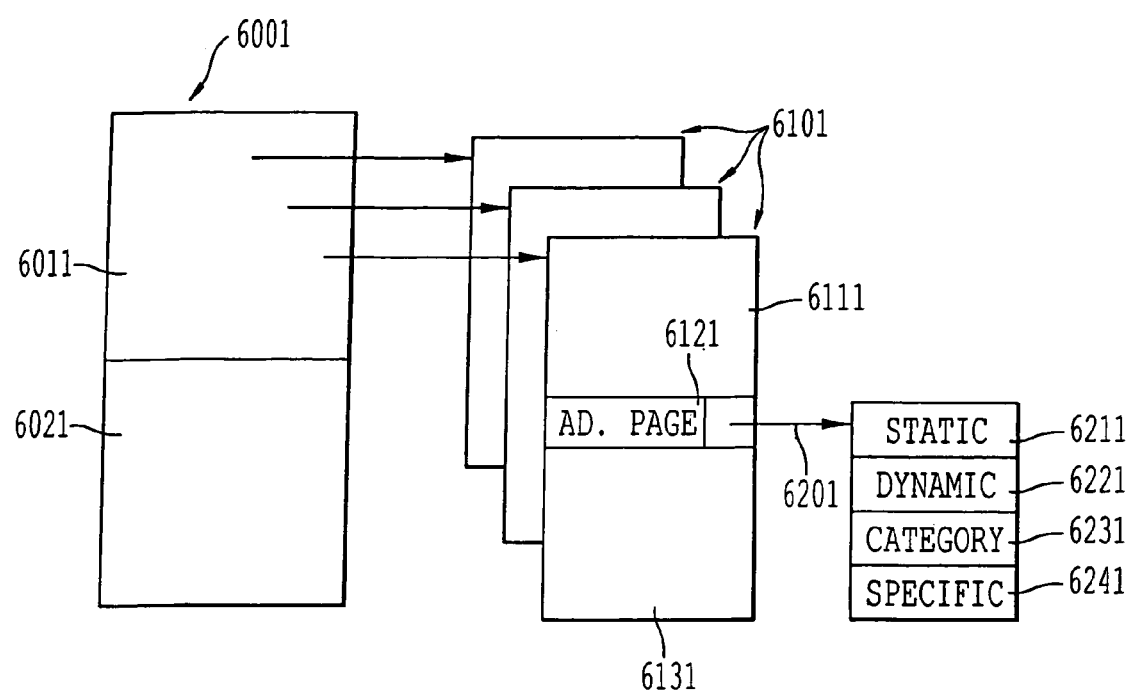
FIG. 6 is a diagram showing an exemplary format used in conjunction with our advertisement system for the representation and coding of book parameters that is an extension to the existing OEB format.

In order to control the appearance of advertisements on the pages of the books 405 as and when they appear as a browsing book 401 on the Internet browsing book site 402, some specifications are needed. One format that the books 405 on the book sites 404 can appear in is the OEB (Open Electronic Book) format defined by an industrial consortium. FIG. 6 depicts the format specification. At the top level there is a book-level specification 6001 that specifies the pages of the book 6011 as well as some parameters associated with the book 6021. The specification of the pages of the book 6101 contains some parameter specifications 6111 and 6131, among which is the specification for advertisement pages 6121. The entry 6121 defines whether the page is an advertisement page. It also has a pointer 6201 that points to a specification of the advertisement: i.e., whether it is static 6211 or dynamic 6221 (as described above, static advertisements are pre-incorporated into the books 405 before they are downloaded and viewed while dynamic advertisements are streamed into the browsing book 401 as they are being viewed on the Internet browsing book site 402), its category 6231 (if it is a static page, the category of the advertisement and if it is a dynamic page, the category it will accept), and its specific name 6241' (e.g., "Coca-Cola®"—if it is a static page, the name of the advertisement and if it is a dynamic page, the name of the advertisement it will accept.)

The dynamic advertisement streaming method described above, though feasible technically, may raise a privacy issue. In this method, the Internet browsing book 401 has to announce to the advertisement server 411 that it is viewing some contents of a certain nature based on the classification code 406 that it sends, possibly also revealing the identity of the person browsing with the browsing book 401. In order to protect the identity of the viewer from the advertisement portal 410, a method called "Privacy-ensured Dynamic Advertisement Streaming" can be used. The two major systems components for implementing this method are illustrated in FIG. 4. as data transfer links 450 and 451 on the one hand, and advertisement relay server 455 on the other.

In this privacy-ensured method, the Internet browsing book 401, instead of communicating directly with the advertisement portal 410 directly through the link 408, communicates with it instead through the links 450 and 451, and through the advertisement relay server 455 which is typically resident on a book site 404.

The advertisement relay server 455 serves to shield the identity of the viewer at the Internet browsing book site 402 from the advertisement portal 410. The advertisement relay server 455 serves to identify the Internet browsing book site 402 that may have requested a book 405 with a certain classification 406 through the link 451, and then the server will request for an appropriate advertisement from the advertisement portal site 410 through the link 450. The identity of the viewer at the Internet browsing book site 402 may be known to the book site 404 when the browsing book site 402 requests a book 405 to be downloaded from the book site 404, but the advertisement relay server 455 need not reveal this information to the advertisement portal 410. Hence this method protects the privacy of the viewer at the Internet browsing book site 402 from the advertisement portal 410.

With this privacy protection mechanism, the identity of the can be protected even during use of our advertisement matching/delivery system 400.

Advertisement revenue can potentially be shared between three parties: the book sites 404, the advertiser sites 413 (if these advertiser sites 413 are in turn brokering the original or other sources of advertisements), and the advertisement portal site 410. The revenue arrangements can be based on either pre-advertised revenue arrangements on the book sites 404 and advertiser sites 413 or pre-advertised revenue arrangements on the book site database 421 or the advertiser site database 414. These pre-advertised arrangements may include specifications relating to how much revenue is to be shared and how the revenue is to be shared among relevant parties for example, as a function of the advertisement arrangement (such as, e.g., whether it is a within book/Web site's pages advertisement or between book/Web sites' pages advertisement, or when and for how long or in what exact forms these advertisements would appear, etc.). If a book site 404 or an advertiser site 413 is contacted by either the book site search engine 420 or the advertiser site search engine 412 that has no pre-advertised revenue arrangement with their sites, a message can be sent to the owners of these sites to request advertisement arrangements, or to add their information including the advertisement and revenue arrangements onto the advertisement portal site's 410 advertiser site database 414 or book site database 421.

Typically, the book site 404 would receive a smaller proportion of the advertisement revenue if the advertisement is to appear between different books/Web sites' pages than if the advertisement were to appear within a particular book/Web site's pages. This is because an advertisement that appears within a book is deemed to benefit more from the book's contents than otherwise. However, market forces of supply and demand will dictate the final arrangement.

Book sites 404, in general, can also include a typical company's or an individual's Web site that contains loosely related HTML pages that together comprise a "Web book." Alternatively, a company/individual could have re-authored its/his/her web site into a book form "Web book" (OEB format, for example) that can be browsed with the Internet browsing book 401. The Internet browsing book 401, as described in copending patent application Ser. No. 09/617,043, filed Jun. 14, 2000, can download and display loose HTML pages as well as books in an extended OEB format.

In order to take advantage of the advertisement matching system's 400 ability to effectively match advertisements over the Internet, the classification code 406 resident in the electronic books 405 is needed. However, to stream advertisements between pages being viewed on the Internet browsing book 401 that are not pages that are part of some electronic books 405 but are instead "loose" HTML pages from one or more Web sites, some classification information of the contents of those Web sites is needed. This classification information can be in the form of a classification code resident on the Web server hosting the Web contents of a Web site, or resident on the HTML pages themselves (but perhaps made invisible). For the latter, there is a need to extend the HTML format for the classification code to remain invisible to viewers of the HTML pages involved.

Figure 7:
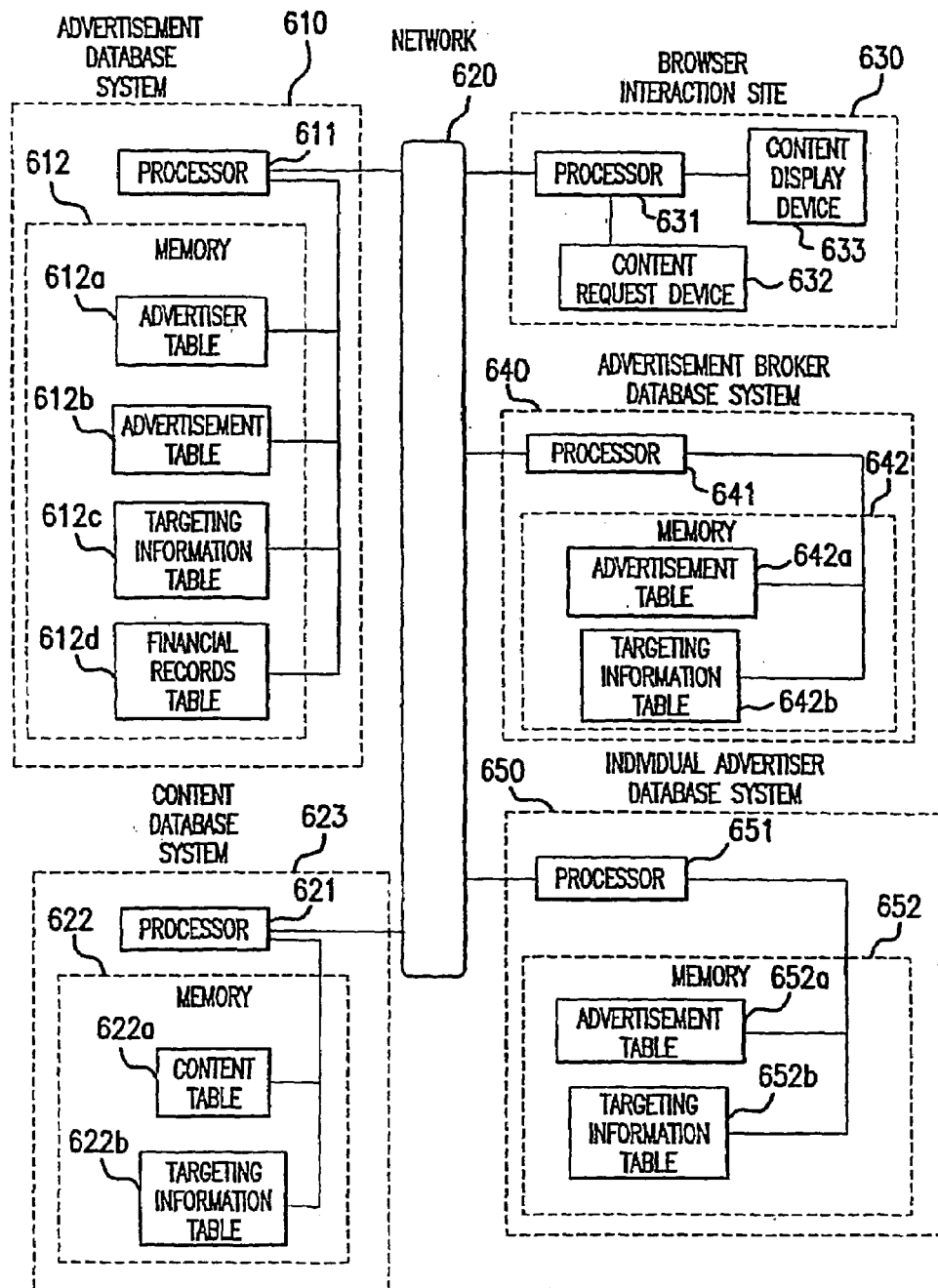
FIG. 7 illustrates an alternate and/or complementary exemplary system for providing advertisements using an Internet browser.

An alternate and/or complementary system for providing advertisements using a browser is illustrated in FIG. 7. More particularly, the system shown in FIG. 7 can provide targeted advertisements using a browser. A more complete description of predictive targeting and marketing is given, e.g., in "The Direct Marketing Handbook," Edward L. Nash, ed., McGraw-Hill, New York, 1992, the entire contents of which are incorporated herein by reference.

The network structure of FIG. 7 will include at least one browser interaction site 630 that, in preferred embodiments, is connected by way of an Internet network 620 to an advertisement database system 610, at least one content database system 623, and, in some embodiments, an advertisement broker database system 640 and/or at least one individual advertiser database system 650. In alternate embodiments, the network 620 can be implemented either as any other type of communications or telecommunications network. For example, the network 620 may be a local area network, a wide area network, a virtual private network, and/or a connection via a public switched telephone network. In an exemplary embodiment, the network 620 includes a number of connection modalities, including a cable-modem connection, a DSL connection, a dial-up modem connection, and/or other suitable connection mechanisms.

The processors 611, 621, 631, 641, and 651 are used for coding and decoding data transmitted over network 620, controlling reading and writing of data in associated memories (e.g., 612, 622, 642, 652), and analyzing the data in those memories. Processor 631 is furthermore configured to received content request information from content request device 632, and to cause content display device 633 to display selected content. The processors 611, 621, 631, 641, and 651 can be any processor configured for high volume data transmission and performing a significant number of mathematical calculations in processing communications (possibly as a webserver), database searches, and computational algorithms. A conventional personal computer or workstation with sufficient memory and processing capability may be configured to act as processors 611, 621, 631, 641, and 651. A PENTIUM III microprocessor such as the 1 GHz PENTIUM III for the SC 242 manufactured by Intel Inc., a Motorola 500 MHz PowerPC G4 processor, and the Advanced Micro Devices 1 GHz AMD ATHLON processor may all be used as processors 611, 621, 631, 641, and 651. The memories 612, 622, 642, 652 can be any sort of processor-accessible data medium, including but not limited to any type of disk including floppy disks, optical disks, CD-ROM, magneto-optical disks, ROMs, RAMs, EPROMs, EEPROMs, flash memory, magnetic or optical cards, or any type of media suitable for storing electronic data.

Browser interaction site 630 includes a content request device 632 and a content display device 633, both electrically connected to processor 631. The browser interaction site 630 is designed to be operated by an individual and, in some embodiments, maintain the identification of the individual in secrecy. Content request device 632 can be any of a number of input devices. Examples of suitable embodiments include keyboards, touch screens, computer mouses, bar code readers, magnetic readers (including strip, disk, and tape readers), smart card readers, pressure sensors, motion detectors, electromagnetic receivers, voltmeters, heat sensors, and other transducers capable of being interfaced with a digital processor and that will transduce a consumer's request information. Content display device 633 is most commonly a computer monitor, but can also include the dedicated and/or specialized displays such the book-like human-computer interface described in U.S. Pat. No. 6,064, 384, the contents of which being incorporated herein by reference.

The advertisement database system 610 is commonly owned and/or operated by the supplier of the browser software. This may be a "first stop" for the browser software when content is requested, and serves to provide the browser software with targeting information, financial information and record keeping, and the actual advertisements themselves to be inserted by the browser software into the displayed content. Memory 612 of the advertisement database system 610 can include any of a number of different tables containing associated data records. Illustrative examples such tables are shown as tables 612a–612d, although other groupings are possible within the scope of the present invention. Advertiser table 612a stores advertiser information such as, for example, a listing of the advertisements of the particular advertiser, targeting information regarding the desired content for insertion of the advertiser's advertisements., contract information regarding the advertiser, payment information regarding the advertiser, times and conditions for displaying certain advertisements of the advertiser, and even, in some embodiments, specific advertisement data. Advertisement table 612b includes the advertisement data relating to individual advertisements and/or various parameters related to their display, billing, and/or other factors. This information also includes images, text, and/or sound files that form the advertisements. Advertisement table 612b can thus contain much of the same information regarding particular advertisements with or without including any information regarding the advertiser. For example, advertisement table 612b can include targeting information regarding the desired content for insertion of the particular advertisements, contract information regarding the particular advertisement, payment information regarding the advertisement, and/or times and/or conditions for displaying the advertisement. The illustration of the tables 612a and 612b with overlapping data is intended to display alternate method of storing, accessing, and analyzing the same information in memory 612. The advertisements stored in advertisement table 612b can either be prenegotiated for display in certain content at certain rates, or they can simply be stored for pending negotiations with an advertiser that may or may not be based upon a display within a particular content.

Continuing with the illustrative development of various data organization schemes, targeting information table 612c can store targeting information in tables separate from the storage of the advertisement data itself. This data can include targeting information such as advertisement classifications that relate to the desired content into which the advertisement is preferably inserted, desired demographic characteristics of readers likely to be accessing certain content, or other information related to the targeting of the advertisements. Targeting information table 612c can also store information related to targeting information of various content and/or extraction of targeting information from content. For example, if a content provider does not provide content targeting information regarding their particular content, then targeting information table 612c can include this information for access by the browser software when a particular content such as a web site is accessed. In this way, a browser software may insert targeted advertisements into content without the content provider's acquiescence. For example, assume that an online newspaper does not wish to provide demographic information regarding their content in HTML format so that a web-browser software can insert advertisements. Targeting information table 612c can include (approximate or actual) demographic information regarding the online newspaper. This information can be acquired, for example, by contacting the online newspaper's advertising department for the relevant demographic information, or it can be extracted from the content itself. For example, a Flesch-Kincaid Grade Level score for the content can be determined automatically (by, e.g., the browser or a maintainer of the advertisement database system 610) and used to assign some demographic characteristics to the content. Alternatively, the document can be searched and the occurrence rate of certain keywords can be used to assign demographic characteristics to the content. For example, frequent occurrence of the word "ninja" in the content might indicate a reader demographic weighted toward pre-teen or teenage males, while frequent occurrence of the word "yacht" might indicate a different reader demographic. Alternatively, the demographic of the advertisements inserted by the content providers themselves can be used to ascertain the reader demographic of a certain content.

Financial records table 612d can include information related to the costs and/or payments associated with the display of a certain advertisement. For example, financial records table 612d can include various weights associated with certain demographic characteristics that can be used to generate a cost of displaying an advertisement that is particular to a particular content. For example, the cost of displaying an advertisement for a sports car in content commonly accessed by 20–30 year old males with a college education during the spring might be higher than the cost of displaying an advertisement to 20–30 year old females with only a high school diploma in the winter. Individual weights could be assigned to individual demographic characteristics of the typical readers of certain content, such as education level, income, age, race, gender, time of year, occupation, and/or other factors. In this way, a sliding cost scale that considers many demographic characteristics together or individually can be generated. Financial records table 612d can also include information such as whether the advertiser has a limit on the amount that the advertiser is willing to spend on advertisements and accounts payable information for the particular advertiser.

Content database system 623 may be a third party site, or a conglomeration of third party sites, that provide content to readers. Content database system 623 may include one of more content tables 622a that store the content itself, as well as a targeting information table 622b that may contain information related to the reader demographic of the content in content table 622a. Naturally, these two tables can be combined or otherwise subdivided. The targeting information table 622b can also be omitted in certain embodiments and such information extracted from the content or otherwise obtained as described above.

In the content of the browser that displays content in the form of a book, content database system 623 may only provide a portion of the total content displayed in a single book representation. For example, two separate websites joined by a hyperlink may form two separate content database systems 623. Although the content of a single book representation may originate from these two individual websites, the advertisements inserted within and/or between the content in the book representation can draw targeting information from one and/or both of these websites.

Individual advertiser database system 650 provides a venue for an individual advertiser to make an advertisement, as well as demographic information regarding the target population of the advertisement, available to a web-browser that is capable of inserting advertisements. Alternatively, if this information has already been stored at an advertisement database systems 610, the individual advertiser database system 650 can be used to monitor and/or approve display of a stored advertisement within a particular content. This venue may be particularly useful when an advertiser has not prenegotiated placement of an advertisement with the operator of the advertisement database system 610. The memory 652 of such an individual advertiser database system 650 can include data regarding one or more advertisements in an advertisement table 652a, and targeting information in a targeting information table 652b. Naturally, these two tables can be combined or otherwise subdivided. Advertisement table 652a can include the actual advertisement itself in the form of an image, sound file, and/or text to be inserted into the content by the browser software. Advertisement table 652a can also include various information related to how, when, and where the advertiser wants the advertisement inserted, billing information for the advertiser, and/or other financial information. For example, the advertisement table 652a can thus constitute a simple repository for advertisements that have prenegotiated insertion locations/costs, etc., or it can constitute a "request for display" whereby a browser that is currently displaying content contacts the advertisement site to see if the advertiser is interested in having (i.e., willing to pay to have) the stored advertisement inserted in the displayed content. Targeting information table 652b can include various weights associated with certain demographic characteristics of the readers of content and/or a list of content database systems 623 that store content in content table 622a into which the advertiser is interested in having an advertisement from advertisement table 652a inserted.

An alternate form or storing and/or locating appropriate advertisements may include an advertisement broker having an advertisement broker database system 640. The advertisement broker database system 640 substantially includes the same information as the individual advertiser database system 650, but for a plurality of individual advertisers. This arrangement may remove the need for a browser software to search multiple individual advertiser database systems 650 before locating a suitable advertisement. Thus, several individual advertisers would provide their advertisements and/or targeting information to the broker, who would locate a suitable advertisement when contacted by the browser software. Alternatively, the advertisement broker database system 640 can monitor and/or approve of insertion of an advertisement already stored in the advertiser database system 610.

Figure 8A:
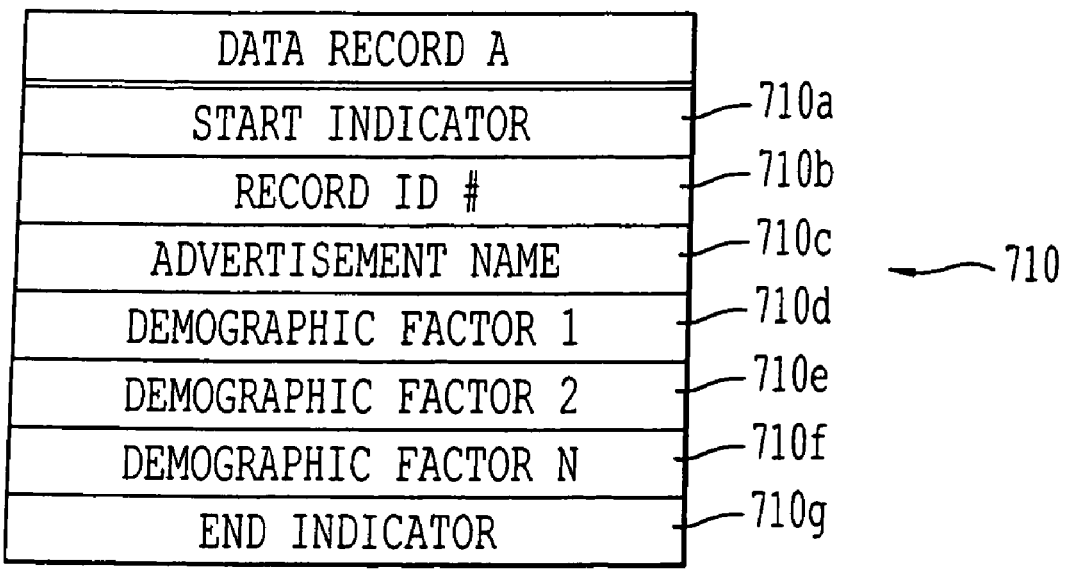
FIGS. 8a–d illustrate exemplary data records for use in the current system.

FIGS. 8a–d illustrate exemplary data records for use in the current system. FIG. 8a illustrates an exemplary data record illustrating targeting information relating to a particular advertisement, such as that found in targeting information tables 612c, 622b, 642b, and 652b of FIG. 7. Field 710c includes an advertisement name or other identification information that can be used to identify an advertisement both to the browser software and to the advertiser when a bill is presented. Fields 710d–f include one or more demographic factors relevant to the advertisement identified in field 710c. The demographic factors can include, for example, weightings used to calculate an amount to be paid for inserting the advertisement into the content identified in field 710c, times the advertisement should be displayed, or even demographic information that would indicate that an advertisement should not be displayed ever to that particular demographic group.

Figure 8B:
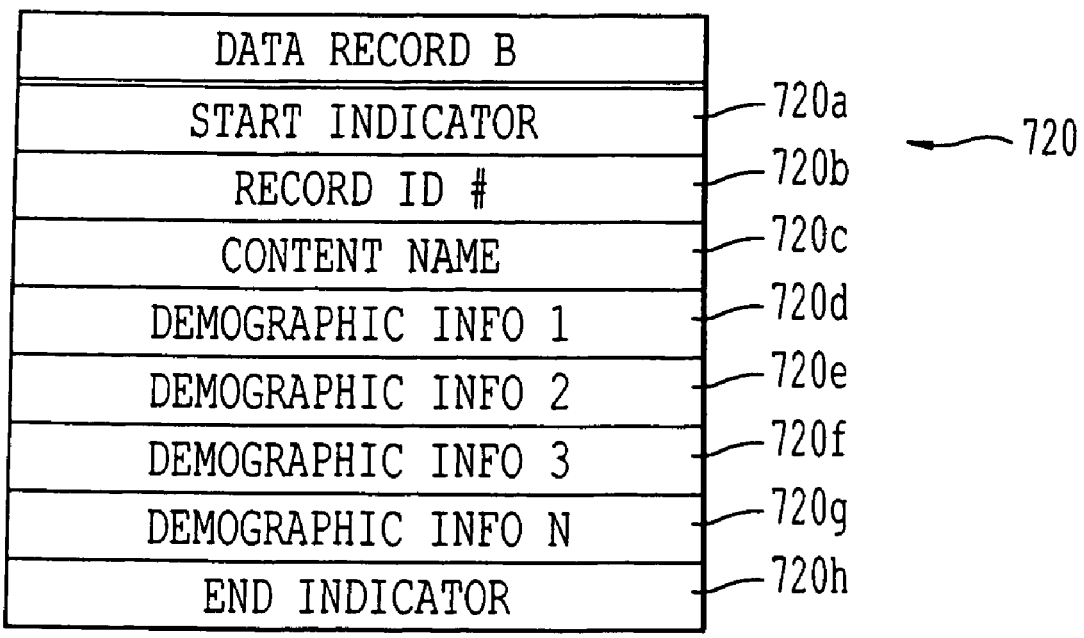

FIG. 8b illustrates an exemplary data record illustrating demographic information relating to a particular content such as that found in targeting information tables 612c and 622b of FIG. 7. Field 720c includes a content name or other identification information that can be used to identify the content both to the browser software and to the advertiser when a bill is presented. Fields 720d–f include data related to the particular demographics of the content. As discussed above, this information can be provided by the content provider in a targeting information table 622b, or it can be generated/extracted by the advertisement database system 610 and placed in a targeting information table 612c. The demographic information of fields 720d–f can relate to any of a number of demographic characteristics, including but not limited to the gender, age, education level, interests, occupation, geographic location, income level, and/or spending habits of the individuals who commonly are interested in the content identified in field 720c. By matching the demographic factors of FIG. 8a with the demographic information of FIG. 8b, a processor can automatically identify targeted advertisements for insertion by the browser software. For example, summing the product of a numerical descriptor of the demographic information in fields 720d–f of FIG. 8b with numerical weightings of the relative importance of the particular demographic information stored in fields 710d–f of FIG. 8a will provide an approximate idea of how targeted an advertisement will be to the demographic of a particular content.

Figure 8C:
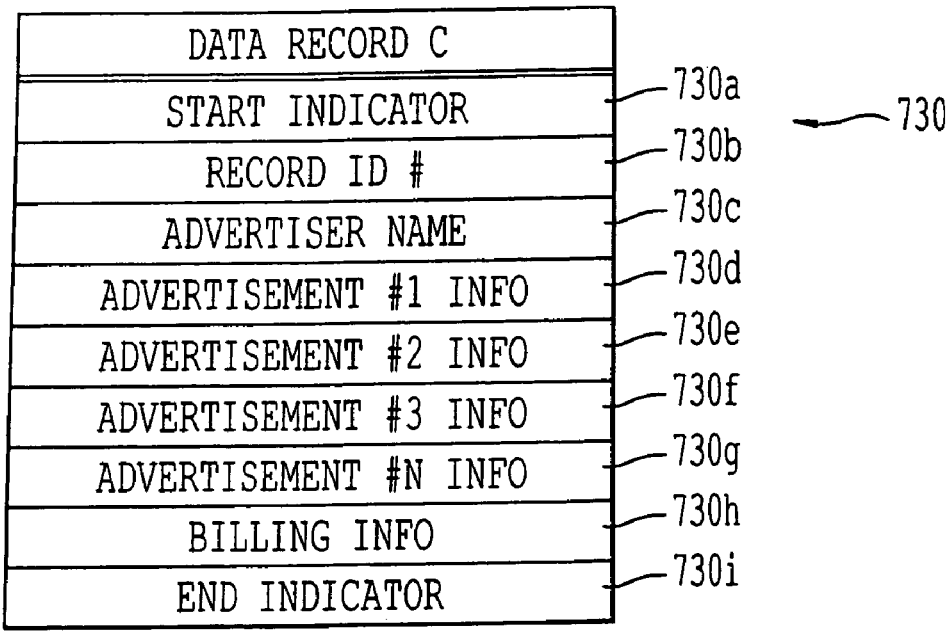

FIG. 8c illustrates an exemplary data record illustrating advertisement information relating to a particular advertiser such as that found in an advertiser table 612a of FIG. 7. Field 730c includes an advertisement name or other identification information that can be used to identify the content both to the browser software and to the advertiser when a bill is presented. Fields 730d–g include data related to the individual advertisements of the particular advertiser identified in field 730c. Fields 730d–g may include other information related to the individual advertisements. For example, demographic factors related to the desired viewers of a particular advertisement may be included in each of the fields 730d–g. Exemplary field 730h includes billing information related to the particular advertiser.

Figure 8D:
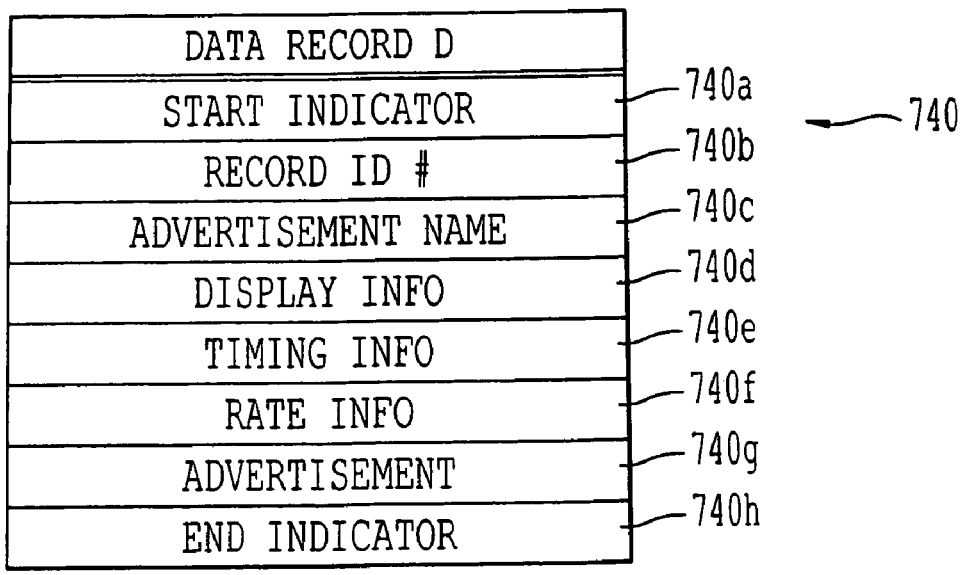

FIG. 8d illustrates an exemplary data record illustrating advertisement information relating to a particular advertisement such as that found in advertisement tables 612b, 642a, and 652a of FIG. 7. Field 740c includes an advertisement name or other identification information that can be used to identify the content both to the browser software and to the advertiser when a bill is presented. Fields 740d–g include data related to the advertisement itself. This data may include the targeting information described in FIG. 8a and/or it may relate to other matters. For example, fields 740d could include information relating to the display (e.g., size and placement) of the advertisement. Field 740e could include information related to when the advertisement should be displayed. Field 740f could include information related to the rate that the advertiser is willing to pay to have the advertisement displayed. This rate information could include the weighting factors mentioned in regard to FIG. 8a. Field 740g could include the advertisement itself, such as information related to the color and location of pixels in an image advertisement.

Figure 9:
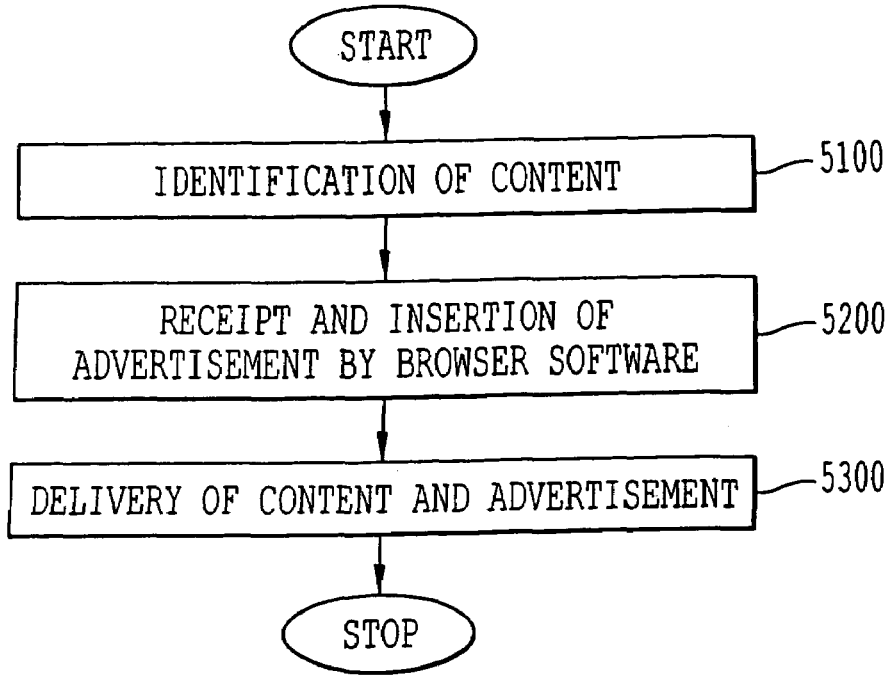
FIG. 9 illustrates a process flow according to a first embodiment of the present invention for insertion and display of an advertisement by browser software.

FIG. 9 illustrates a process flow according to a first embodiment of the present invention for insertion and display of an advertisement by browser software. The process flow starts with the identification of a desired content by a reader and/or browser software user in step 5100. This can occur by any of a number of known mechanisms, including receiving a mouse click upon a hyperlink by a reader and/or browser software user. A signal identifying the desired content is transmitted by the browser software and an advertisement is returned by way of a network such as network 620 of FIG. 7. This advertisement is received by the browser software and inserted within the desired content in step 5200. According to the present invention, the desired content need not be transmitted over the network 620. For example, it could be stored on a computer readable medium at the home computer of the reader and/or browser software user. Once content is identified in step 5100, the process flow can proceed with step 5200 regardless of the origins of the identified content. Thereafter, in step 5300, the content and inserted advertisement are delivered to the consumer, commonly upon some display device for illustrating electronic messages.

Figure 10:
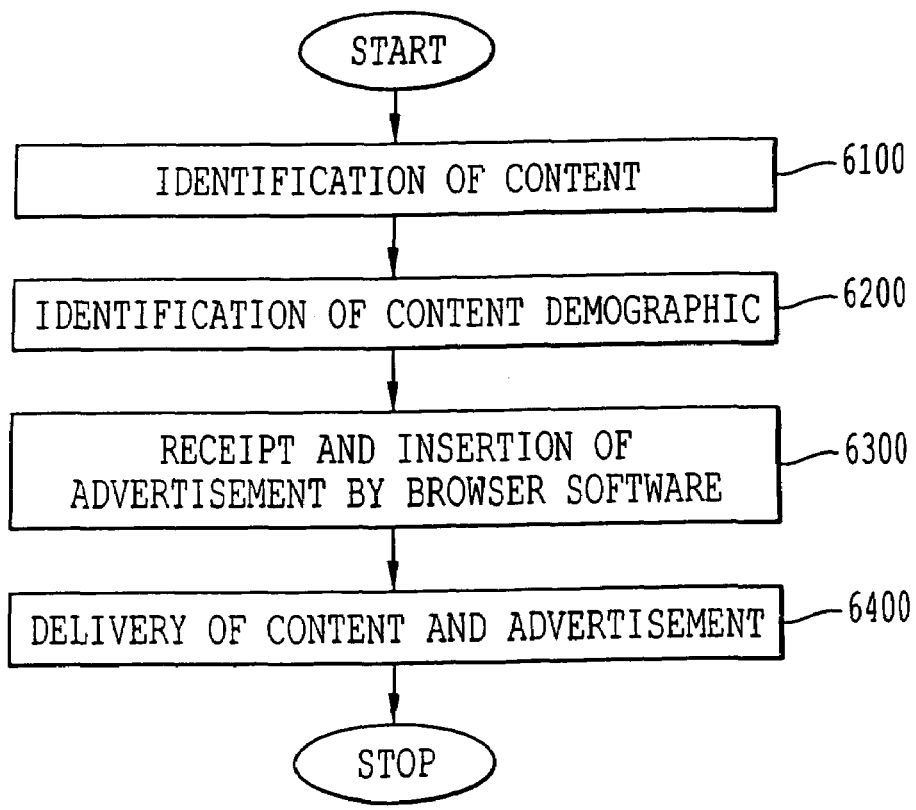
FIG. 10 illustrates a process flow according to a second embodiment of the present invention for insertion and display of an advertisement by browser software.

FIG. 10 illustrates a process flow according to a second embodiment of the present invention for insertion and display of an advertisement by browser software wherein the content demographic is also identified. This is performed in step 6200, wherein a demographic of the population that is likely to be reading the content identified in step 6100 is also identified. Once the content demographic is identified, it can be used in step 6300 to provide a targeted advertisement which, along with the identified content, is delivered in step 6400.

Figure 11:
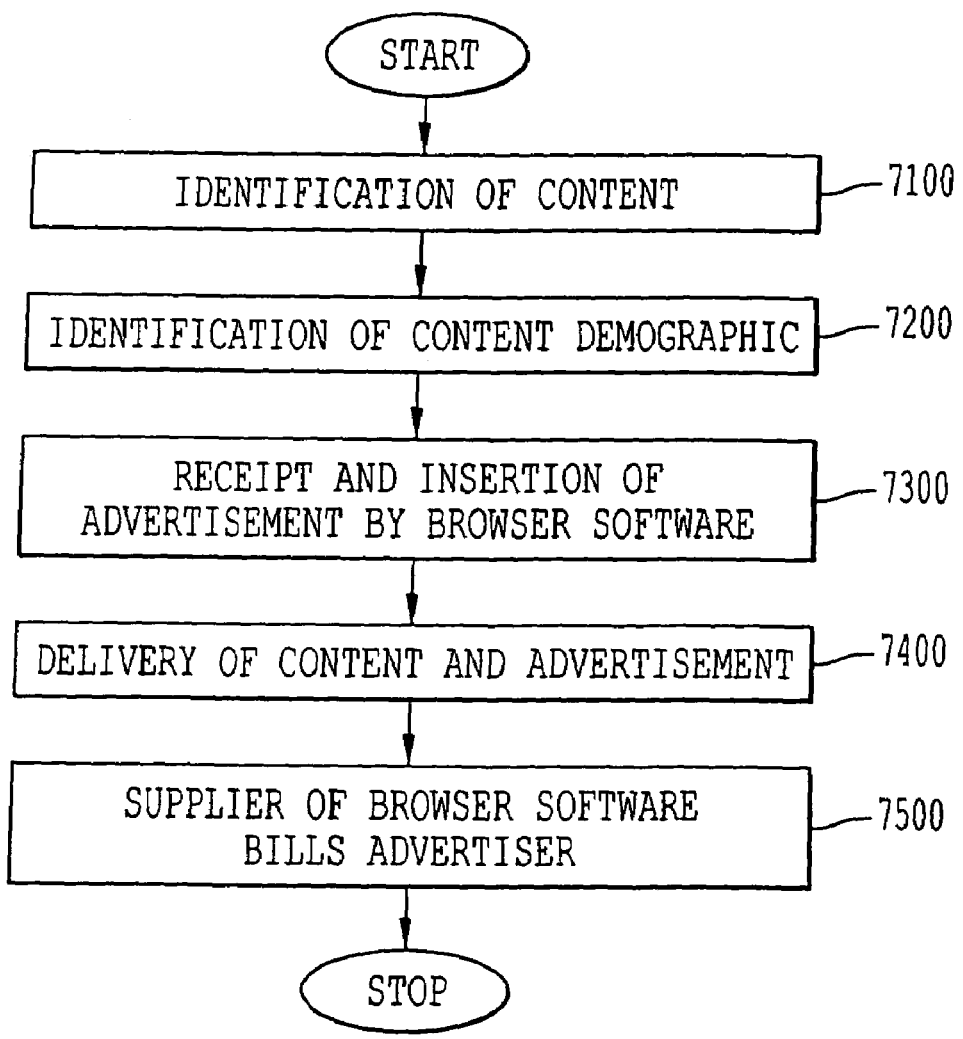
FIG. 11 illustrates a process flow according to a third embodiment of the present invention for insertion and display of an advertisement by browser software.

FIG. 11 illustrates a process flow according to a third embodiment of the present invention for insertion and display of an advertisement by browser software wherein an advertiser is billed directly by the supplier of the browser software (or the supplier of the database used by the browser software) to identify a content demographic or an advertisement for insertion within the content. Billing of the advertiser is performed in step 7500, preferably after the delivery of the content with inserted advertisement to the reader/user of web browser. As illustrated in this figure, the content demographic is identified in step 7200. This step 7200 is naturally not necessary for billing the advertiser, but rather is included to indicate that either the browser software supplier, or the entity that maintains one or more databases accessed by the browser software, can generate revenue.

Figure 12:
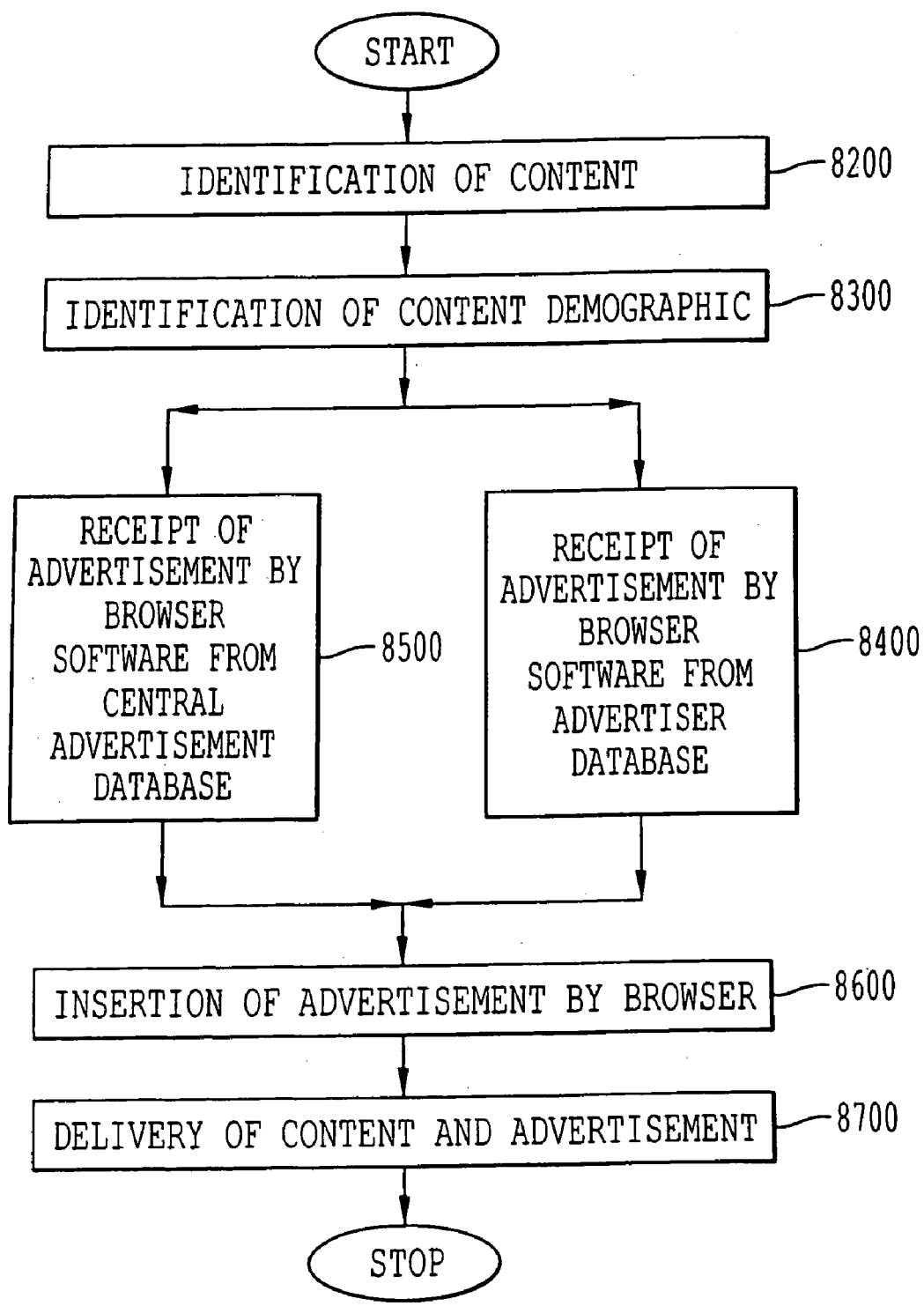
FIG. 12 illustrates a process flow according to a fourth embodiment of the present invention for insertion and display of an advertisement by browser software.

FIG. 12 illustrates a process flow according to a fourth embodiment of the present invention for insertion and display of an advertisement by browser software, whereby the previously-discussed static and dynamic advertisement delivery methods are further described. Step 8500 illustrates one method of embodying the static delivery method whereby an advertiser has prenegotiated a contract with the supplier of the browser software or the maintainer of a database accessed by the browser software, such as an advertisement database system 610 of FIG. 7. In this case, the advertisement is selected directly from the advertisement database system 610 of FIG. 7 after a particular content is accessed from, for example, a content database system 623 of FIG. 7. Naturally, both the content database system 623 and the advertisement database system 610 of FIG. 7 can be operated by the same entity. Alternatively, if there has been no prenegotiated advertisement for the selected content, a dynamic insertion that includes the search of plural individual advertiser database systems 650 and/or advertisement broker database systems 640 can be performed. The actual storage location of an advertisement is not constrained by the time at which an advertising relationship was negotiated, but rather these examples are given to provide one illustrative embodiment of the present invention.

Figure 13:
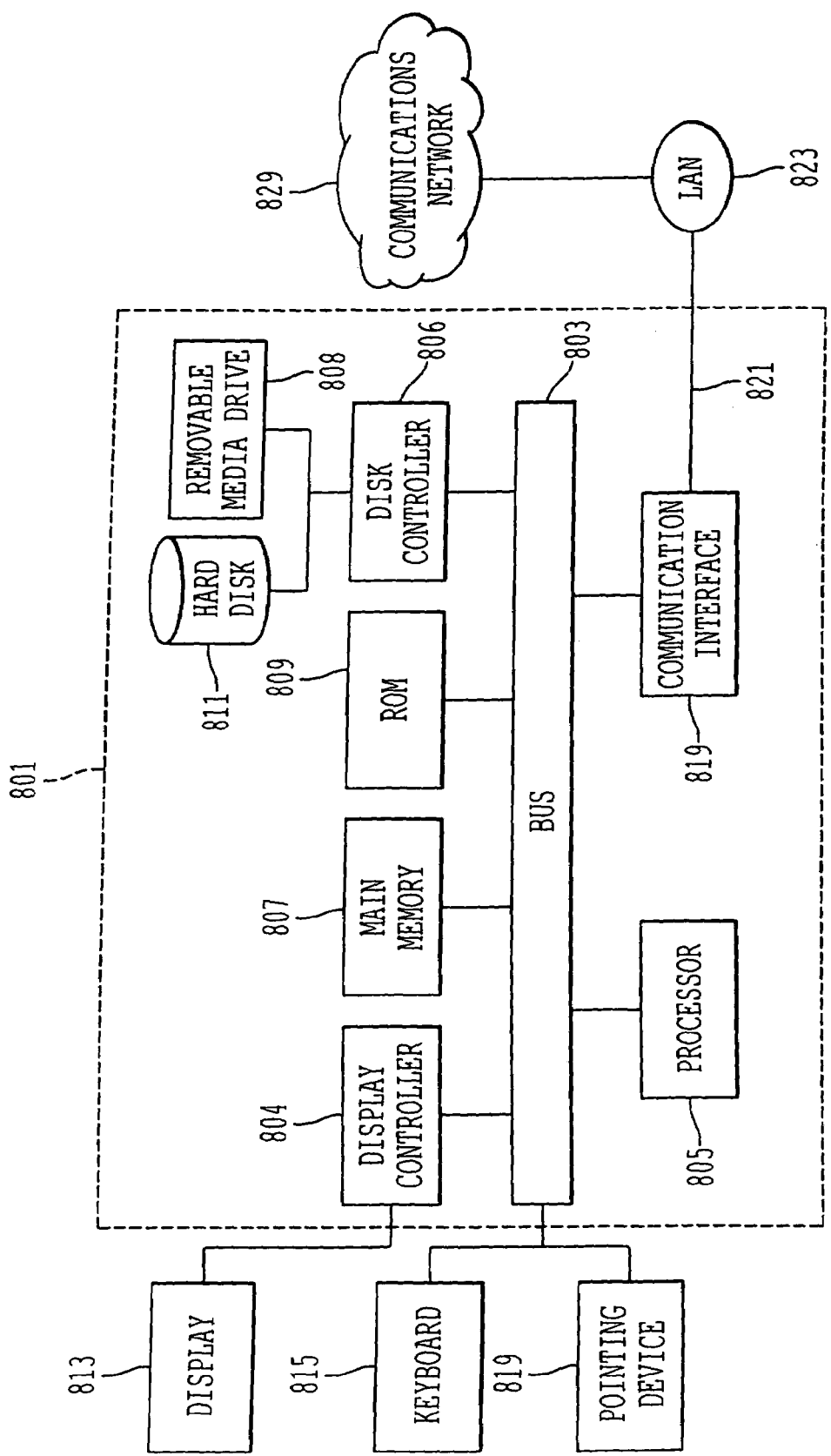
FIG. 13 illustrates an exemplary computer system upon which, for example, many of the database systems illustrated in FIG. 7 can be implemented.

FIG. 13 illustrates an exemplary computer system 801 upon which, for example, many of the database systems illustrated in FIG. 7 can be implemented according to the present invention. For example, computer system 801 can alternately form the advertisement database system 610, the content database system 623, the browser interaction site 630, the advertisement database system 640, and/or the individual advertiser database system 650 of FIG. 7. For this reason, the computer system 801 will be described using unique reference numerals. When a part of computer system 801 that is analogous to a part in another figure is described, this will be explicitly stated in the text. Computer system 801 includes a bus 803 or other communication mechanism for communicating information, and a processor 805 coupled with bus 803 for processing the information. Processor 805 can form any or all of the processors 611, 621, 631, 641, and/or 651 of FIG. 7. Computer system 801 also includes a main memory 807, such as a random access memory (RAM) or other dynamic storage device (e.g., dynamic RAM (DRAM), static RAM (SRAM), synchronous DRAM (SDRAM), flash RAM), coupled to bus 803 for storing information and instructions to be executed by processor 805. In addition, main memory 807 may be used for storing temporary variables or other intermediate information during execution of instructions to be executed by processor 805. Computer system 801 further includes a read only memory (ROM) 809 or other static storage device (e.g., programmable ROM (PROM), erasable PROM (EPROM), and electrically erasable PROM (EEPROM)) coupled to bus 803 for storing static information and instructions for processor 805. A storage device 811, such as a magnetic disk or optical disk, is provided and coupled to bus 803 for storing information and instructions. Storage device 811 can contain any and/or all of the data storage tables 612a, 612b, 612c, 612d, 622a, 622b, 642a, 642b, 652a, and/or 652b of FIG. 7.

The computer system 801 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 801 using an appropriate device bus (e.g., a small computer system interface (SCSI) bus, an enhanced integrated device electronics (IDE) bus, or an ultra-direct memory access (DMA) bus). Such removable media devices and fixed, high density media drives can also contain the data storage tables 612a, 612b, 612c, 612d, 622a, 622b, 642a, 642b, 652a, and/or 652b of FIG. 7. The computer system 801 may additionally include a compact disc reader, a compact disc reader-writer unit, or a compact disc juke box, each of which may be connected to the same device bus or another device bus.

Computer system 801 may be coupled via bus 803 to a display 813, such as a cathode ray tube (CRT), for displaying information to a computer user. Display 813 can form a content display device 633 of FIG. 7. The display 813 may be controlled by a display or graphics card. The computer system includes input devices, such as a keyboard 815 and a cursor control 817, for communicating information and command selections to processor 805. The keyboard 815 and/or a cursor control 817 can form a content request device 632 of FIG. 7. The cursor control 817, for example, is a mouse, a trackball, or cursor direction keys for communicating direction information and command selections to processor 805 and for controlling cursor movement on the display 813.

The computer system 801 performs a portion or all of the processing steps of the invention in response to processor 805 executing one or more sequences of one or more instructions contained in a memory, such as the main memory 807. Such instructions may be read into the main memory 807 from another computer readable medium, such as storage device 811. One or more processors in a multi-processing arrangement may also be employed to execute the sequences of instructions contained in main memory 807. In alternative embodiments, hard-wired circuitry may be used in place of or in combination with software instructions. Thus, embodiments are not limited to any specific combination of hardware circuitry and software.

As stated above, the system 801 includes at least one computer readable medium or memory programmed according to the teachings of the invention and for storing data structures, tables, records, or other data described herein. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling the computer system 801, for driving a device or devices for implementing the invention, and for enabling the computer system 801 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 805 for execution. A computer readable medium may take many forms, including but not limited to, non-volatile media, volatile media, and transmission media. Non-volatile media includes, for example, optical, magnetic disks, and magneto-optical disks, such as storage device 811. Volatile media includes dynamic memory, such as main memory 807. Transmission media includes coaxial cables, copper wire and fiber optics, including the wires that comprise bus 803. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 805 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 801 may receive the data on the telephone line and use an infrared transmitter to convert the data to an infrared signal. An infrared detector coupled to bus 803 can receive the data carried in the infrared signal and place the data on bus 803. Bus 803 carries the data to main memory 807, from which processor 805 retrieves and executes the instructions. The instructions received by main memory 807 may optionally be stored on storage device 811 either before or after execution by processor 805.

Computer system 801 also includes a communication interface 819 coupled to bus 803. Communication interface 819 provides a two-way data communication coupling to a network link 821 that is connected to a local network 823. For example, communication interface 819 may be a network interface card to attach to any packet switched local area network (LAN). As another example, communication interface 819 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 819 sends and receives electrical, electromagnetic or optical signals that carry digital data streams representing various types of information. Network link 821 typically provides data communication through one or more networks to other data devices. For example, network link 821 may provide a connection to a computer through local network 823 (e.g., a LAN) or through equipment operated by a service provider, which provides communication services through a communications network 827. Communications network 827 can form network 620 of FIG. 7. In some embodiments, local network 823 and communications network 827 preferably use electrical, electromagnetic, or optical signals that carry digital data streams. The signals through the various networks and the signals on network link 821 and through communication interface 819, which carry the digital data to and from computer system 801, are exemplary forms of carrier waves transporting the information. Computer system 801 can transmit notifications and receive data, including program code, through the network(s), network link 821 and communication interface 819.

While particular embodiments of the present invention have been illustrated and described, it will be appreciated that numerous changes and modifications will occur to those skilled in the art, and it is intended that the appended claims cover all those changes and modifications which fall within the spirit and scope of the present invention.

Obviously numerous modifications and variations of the present invention are possible in light of the above teachings. It is therefore to be understood that within the scope of the appended claims, the invention may be practiced otherwise than specifically described herein.

What is claimed as new and is desired to be secured by Letters Patent of the United States is:

1. A method of integrating and displaying an advertisement with a particular electronic content, comprising steps of:
   identifying and accessing said particular electronic content;
   inserting said particular electronic content into a display of a browsable electronic book;
   dynamically receiving said advertisement;
   inserting said advertisement into said display;
   preparing said content and said advertisement for display; and
   displaying said content and said advertisement in a browsable electronic book configured to display a plurality of pages simultaneously flipping as a group or individually.

2. The method according to claim 1, wherein said steps of identify, receiving, inserting, and preparing are performed by a web browser.

3. The method according to claim 1, further comprising a step of:
   targeting said advertisement to said particular electronic content on the basis of a received electronic book classification code.

4. The method according to claim 3, wherein
   said targeting step comprises at least one of developing and receiving at least one unit of demographic information associated with said particular electronic content.

5. The method according to claim 4, wherein
   said targeting step comprises comparing an advertisement target audience with said unit of demographic information associated with said particular electronic content.

6. The method according to claim 1, further comprising:
   a step of billing an advertiser for said advertisement.

7. A system for inserting an advertisement into a particular electronic content, comprising:
   a content request device configured to allow a reader to identify said particular electronic content;
   a receiver configured to dynamically receive said advertisement to be inserted within said particular electronic content;
   an insertion mechanism configured to insert said advertisement into said particular electronic content; a display preparation device configured to prepare said content including said advertisement for display; and
   a display device configured to display a browsable electronic book comprising a plurality of pages simultaneously flipping as a group or individually and having said advertisement contained on at least one of said flipping pages.

8. The system according to claim 7, further comprising:
   a decision unit configured to consider advertisement information with content demographic information and output a comparison result; and
   a selection unit configured to select said particular advertisement based upon said comparison result.

9. The system according to claim 7, further comprising;
   a debit notice generator configured to debit an advertiser.

10. A system for inserting an advertisement into a particular electronic content, comprising:
    means for identifying said particular electronic content;
    means for dynamically receiving said advertisement to be inserted within said particular electronic content;
    means for inserting said advertisement into said particular electronic content; and
    means for displaying said content including said advertisement in a browsable electronic book configured to display a plurality of pages simultaneously flipping as a group or individually with said advertisement contained on at least one of said flipping pages.

11. A method of generating revenue, comprising steps of:
    receiving a content from a web site;
    dynamically receiving an advertisement to be inserted within said content;

inserting said advertisement at a location within said content;

preparing said content including said advertisement for display;

displaying said content including said advertisement in a browsable electronic book configured to display a plurality of pages simultaneously flipping as a group or individually with said advertisement contained on at least one of said flipping pages; and billing an advertiser using said advertisement to promote a product.

12. The method according to claim 11, further comprising steps of:

gathering demographic information regarding a population likely to be accessing said content; and matching said gathered demographic information with a target audience of said advertisement.

13. A system for generating advertising revenue, comprising:

means for accessing a content from a web site;

means for gathering demographic information regarding a population likely to be accessing said content;

means for matching the gathered demographic information with a target audience of said advertisement;

means for accessing said advertisement based upon a target audience matching advertising criteria;

means for preparing said content including dynamically receiving said advertisement for display;

means for displaying said content including said advertisement in a browsable electronic book configured to display a plurality of pages simultaneously flipping as a group or individually with said advertisement contained on at least one of said flipping pages; and means for billing an advertiser using said advertisement.

14. A system for generating advertising revenue, comprising:

a data access device configured to access a content from a web site;

a demographic information gathering device configured to gather demographic information regarding a population likely to be accessing said content;

a matching device configured to match the gathered demographic information with a target audience of said advertisement;

a receiving device configured to dynamically access an advertisement based on said matched gathered demographic information;

an insertion device configured to insert said advertisement within said content;

a content preparation device configured to prepare said content and said advertisement for display;

a display device configured to display said content including said advertisement in a browsable electronic book configured to display a plurality of pages simultaneously flipping as a group or individually with said advertisement on at least one of said flipping pages; and a billing device configured to bill an advertiser using said advertisement to promote a product.

15. The method according to claim 1, wherein said displaying step comprises:

displaying said advertisement over more than one page of said flipping pages.

16. The method according to claim 2, wherein said receiving step comprises:

receiving via a dynamic streaming mechanism.

17. The method according to claim 1, further comprising a step of:

pre-registering data by at least one of an advertiser, a publisher, and a subscriber.

18. The method according to claim 1, further comprising a step of:

maintaining subscriber privacy by limiting distribution of subscriber information.

19. The method according to claim 3, wherein said targeting step comprises exploiting an advertisement parameter.

20. The method according to claim 19, wherein said advertisement parameter comprises at least one of:

an advertisement identification;
an advertisement category;
a display duration;
an advertisement dimension;
an advertisement position;
an advertisement start time;
an advertisement stop time;
an advertisement repeat rate; and
at advertisement rate.

21. The method according to claim 4, wherein said at least one unit of demographic data comprises:

gender;
age;
education level;
interests;
occupation;
geographic location;
income level; and
spending habits.

22. The system according to claim 7, wherein said insertion mechanism is configured to insert said advertisement over more than one page of said flipping pages.

23. The system according to claim 7, wherein said receiver is configured to receive via a dynamic streaming mechanism.

24. The system according to claim 7, further comprising:

a pre-registration device configured to preregister data from at least one of an advertiser, a publisher, and a subscriber.

25. The system according to claim 7, further comprising:

a subscriber privacy mechanism configured to limit distribution of subscriber information.

26. The system according to claim 7, further comprising:

a targeting mechanism configured to exploit an advertisement parameter.

27. The system according to claim 26, wherein said advertisement parameter comprises at least one of:

an advertisement identification;
an advertisement category;
a display duration;
an advertisement dimension;
an advertisement position;
an advertisement start time;
an advertisement stop time;
an advertisement repeat rate; and
an advertisement rate.

28. The system according to claim 26, wherein said targeting mechanism configured to exploit demographic data comprising at least one of:

gender;
age;
education level;
interests;
occupation;
geographic location;

income level; and spending habits.

29. The system according to claim 10, further comprising:

means for pre-registering data by at least one of an advertiser, a publisher, and a subscriber.

30. The system according to claim 10, further comprising:

means for ensuring subscriber privacy.

31. The system according to claim 11, further comprising:

means for targeting said advertisement to a target audience.

32. The method according to claim 12, wherein said displaying step comprises:

displaying said advertisement over more than one page of said flipping pages.

33. The method according to claim 13, wherein said receiving an advertisement step comprises:

receiving via a dynamic streaming mechanism.

34. The method according to claim 11, further comprising a step of:

pre-registering data by at least one of an advertiser, a publisher, and a subscriber.

35. The method according to claim 11, further comprising:

maintaining subscriber privacy by limiting distribution of subscriber information.

36. The system according to claim 13, further comprising:

means for pre-registering data by at least one of: an advertiser, a publisher, and a subscriber.

37. The method according to claim 12, wherein said matching step comprises:

exploiting an advertisement parameter.

38. The method according to claim 37, wherein said advertisement parameter comprises at least one of:

an advertisement identification;

an advertisement category;

a display duration;

an advertisement dimension;

an advertisement position;

an advertisement start time;

an advertisement stop time;

an advertisement repeat rate; and an advertisement rate.

39. The method according to claim 12, wherein said demographic data comprises at least one of:

gender;

age;

education level;

interests;

occupation;

geographic location;

income level; and spending habits.

40. The system according to claim 13, further comprising:

means for ensuring subscriber privacy.

41. The system according to claim 14, wherein said display device is configured to display said advertisement over more than one page of said flipping pages.

42. The system according to claim 15, wherein said receiving device is configured to receive via a dynamic stoning mechanism.

43. The system according to claim 14, further comprising:

a pre-registration device configured to pre-register data by at least one of an advertiser, a publisher, and a subscriber.

44. The system according to claim 14, further comprising:

a subscriber privacy device configured to limit distribution of subscriber information.

45. The system according to claim 14, wherein said matching device is configured to exploit an advertisement parameter.

46. The system according to claim 45, wherein said advertisement parameter comprises at least one of:

an advertisement identification;

an advertisement category;

a display duration;

an advertisement dimension;

an advertisement position;

an advertisement start time;

an advertisement stop time;

an advertisement repeat rate; and an advertisement rate.

47. The system according to claim 14, wherein the gathered demographic data comprises:

gender;

age;

education level;

interests;

occupation;

geographic location;

income level; and spending habits.

48. A computer readable medium containing program instructions for execution on a computer system, which when executed by a computer, cause the computer system to perform the following steps:

identifying and accessing a particular electronic content;

inserting said particular electronic content into a display of a browsable electronic book;

dynamically receiving said advertisement;

inserting said advertisement into said display, preparing said content and said advertisement for display; and displaying said content and said advertisement in a browsable electronic book configured to display a plurality of pages simultaneously flipping as a group or individually.

49. The computer readable medium according to claim 48, wherein said steps of identifying, receiving, inserting, and preparing are performed by a web browser.

50. The computer readable medium according to claim 48, further comprising instructions for:

targeting said advertisement to said particular electronic content on the basis of a received electronic book classification code.

51. The computer readable medium according to claim 50, wherein said targeting step comprises:

at least one of developing and receiving at least one unit of demographic information associated with said particular electronic content.

52. The computer readable medium according to claim 51, wherein said targeting step comprises:

comparing an advertisement target audience with said unit of demographic information associated with said particular electronic content.

53. The computer readable medium according to claim 48, further comprising instructions for billing an advertiser for said advertisement.

54. The computer readable medium according to claim 48, wherein said displaying step comprises:

displaying said advertisement over more than one page of said flipping pages.

55. The computer readable medium according to claim 48, wherein said receiving step comprises:
receiving via a disc streaming mechanism.

56. The computer readable medium according to claim 48, further comprising instructions for:
pre-registering data by at least one of an advertiser, a publisher, and a subscriber.

57. The computer readable medium according to claim 48, further comprising instructions for:
maintaining subscriber privacy by limiting distribution of subscriber information.

58. The computer readable medium according to claim 53, wherein said targeting step comprises:
exploiting an advertisement parameter.

59. The computer readable medium according to claim 58, wherein said advertisement parameter comprises at least one of:
an advertisement identification;
an advertisement category;
a display duration;
an advertisement dimension;
an advertisement position;
an advertisement start time;
an advertisement stop time;
an advertisement repeat rate; and
an advertisement rate.

60. The computer readable medium according to claim 51, wherein said at least one unit of demographic data comprises:
gender;
age;
education level;
interests;
occupation;
geographic location;
income level; and
spending habits.

61. A computer readable medium containing program instructions for execution on a computer system, which when executed by a computer, cause the computer system to perform the following steps:
receiving a content from a web site;
dynamically receiving an advertisement to be inserted within said content;
inserting said advertisement at a location within said content;
preparing said content including said advertisement for display;
displaying said content including said advertisement in a browsable electronic book configured to display a plurality of pages simultaneously flipping as a group or individually with said advertisement contained on at least one of said flipping pages; and
billing an advertiser using said advertisement to promote a product.

62. The computer readable medium according to claim 61, further comprising instructions for:
gathering demographic information regarding a population likely to be accessing said content; and matching said gathered demographic information with a target audience of said advertisement.

63. The computer readable medium according to claim 61, wherein said displaying step comprises:
displaying said advertisement over more than one page of said flipping pages.

64. The computer readable medium according to claim 61, wherein said receiving an advertisement step comprises:
receiving via a dynamic streaming mechanism.

65. The computer readable medium according to claim 62, further comprising instructions for:
pre-registering data by at least one of an advertiser, a publisher, and a subscriber.

66. The computer readable medium according to claim 61, further comprising:
maintaining subscriber privacy by limiting distribution of subscriber information.

67. The computer readable medium according to claim 62, wherein said matching step comprises:
exploiting an advertisement parameter.

68. The computer readable medium according to claim 67, wherein said advertisement parameter comprises at least one of:
an advertisement identification;
an advertisment category;
a display duration;
an advertisement dimension;
an advertisement position;
an advertisement start time;
an advertisement stop time;
an advertisement repeat rate; and
an advertisement rate.

69. The computer readable medium according to claim 62, wherein said demographic data comprises at least one of:
gender;
age;
education level;
interests;
occupation;
geographic location;
income level; and
spending habits.

* * * * *